United States Patent
Liu et al.

(10) Patent No.: US 12,261,794 B2
(45) Date of Patent: *Mar. 25, 2025

(54) METHOD AND APPARATUS FOR ALLOCATING MUTING RESOURCES FOR COMMUNICATIONS BETWEEN WIRELESS COMMUNICATION NODES

(71) Applicant: ZTE CORPORATION, Shenzhen (CN)

(72) Inventors: Xing Liu, Shenzhen (CN); Feng Bi, Shenzhen (CN); Weimen Xing, Shenzhen (CN)

(73) Assignee: ZTE CORPORATION, Shenzhen (CN)

( * ) Notice: Subject to any disclaimer, the term of this patent is extended or adjusted under 35 U.S.C. 154(b) by 0 days.

This patent is subject to a terminal disclaimer.

(21) Appl. No.: 18/221,323

(22) Filed: Jul. 12, 2023

(65) Prior Publication Data
US 2023/0361956 A1  Nov. 9, 2023

Related U.S. Application Data

(63) Continuation of application No. 17/071,204, filed on Oct. 15, 2020, now Pat. No. 11,743,005, which is a
(Continued)

(51) Int. Cl.
*H04L 5/00* (2006.01)
(52) U.S. Cl.
CPC .................. *H04L 5/0048* (2013.01)

(58) Field of Classification Search
CPC ... H04L 5/0048; H04L 5/0035; H04L 5/0094; H04L 5/0007; H04L 5/0023;
(Continued)

(56) References Cited

U.S. PATENT DOCUMENTS

| | | | |
|---|---|---|---|
| 9,020,051 | B2 | 4/2015 | Lee et al. |
| 2008/0165858 | A1 | 7/2008 | Karczewicz et al. |

(Continued)

FOREIGN PATENT DOCUMENTS

| | | |
|---|---|---|
| CN | 107113265 A | 8/2017 |
| JP | 2013255230 A | 12/2013 |

(Continued)

OTHER PUBLICATIONS

"Inter-IAB-node discovery", 3GPP TSG RAN WG2 meeting #102, Busan, South Korea, May 21-25, 2018 (R2-1808009) (Year: 2018).*
(Continued)

*Primary Examiner* — Sun Jong Kim
(74) *Attorney, Agent, or Firm* — Duane Morris LLP

(57) ABSTRACT

A method and apparatus for indication of resource ports in a communication system is disclosed, wherein a method performed by a first wireless communication node, includes: receiving at least one measurement resource from a second wireless communication node in a communication system; determining at least one overlapping resource between the at least one measurement resource and a first plurality of resource sets; and determining at least one muting resource set in the first plurality of resource sets, wherein the at least one muting resource set comprises the at least one overlapping resource.

17 Claims, 21 Drawing Sheets

Related U.S. Application Data continuation of application No. PCT/CN2018/096824, filed on Jul. 24, 2018.

(58) Field of Classification Search
CPC ............. H04B 7/2606; H04B 7/15528; H04W 84/047; H04W 88/04
See application file for complete search history.

(56) References Cited

U.S. PATENT DOCUMENTS

| | | | |
|---|---|---|---|
| 2011/0243009 A1* | 10/2011 | Chandrasekhar | H04W 24/10 370/252 |
| 2011/0305295 A1* | 12/2011 | Kim | H04L 5/0053 375/295 |
| 2012/0165053 A1 | 6/2012 | Yoon et al. | |
| 2013/0194931 A1 | 8/2013 | Lee et al. | |
| 2013/0322350 A1 | 12/2013 | Gaur et al. | |
| 2014/0112253 A1 | 4/2014 | Nagata et al. | |
| 2014/0146689 A1 | 5/2014 | Gaur et al. | |
| 2015/0103800 A1 | 4/2015 | Seo | |
| 2018/0376501 A1 | 12/2018 | John Wilson et al. | |
| 2020/0154296 A1 | 5/2020 | Siomina et al. | |
| 2021/0289509 A1 | 9/2021 | Saito et al. | |

FOREIGN PATENT DOCUMENTS

| | | |
|---|---|---|
| KR | 101253197 B1 | 4/2013 |
| RU | 2428815 C2 | 9/2011 |
| WO | 2013045741 A1 | 4/2013 |
| WO | 2017052458 A1 | 3/2017 |
| WO | 2018108295 A1 | 6/2018 |

OTHER PUBLICATIONS

OPPO, "Discussion of backhaul link enhancement for IAB", 3GPP TSG RAN WG1 Meeting #93, R1-1806859, Busan, Korea, May 12, 2018, 7 pages.

Nokia, "Measurements for IAB", 3GPP TSG RAN WG1 Meeting #93, R1-1806663, Busan, Korea, May 12, 2018, 5 pages.

Qualcomm Incorporated, "Enhancements to support NR backhaul links" 3GPP TSG RAN WG1 Meeting #93 R1-1807393, Busan, Korea, May 21-25, 2018, 16 pages.

Samsung, "Necessary Enhancements for NR IAB" 3GPP TSG RAN WG1 Meeting #93 R1-1806765, Busan, Korea, May 21-25, 2018, 4 pages.

Qualcomm Incorporated. "Inter-IAB-node discovery" R2-1808009, 3GPP TSG RAN WG2 Meeting #102 Busan, South Korea, May 25, 2018, Sections 2-4, 6 pages.

Qualcomm Incorporated. "Inter-IAB-node discovery" R3-183115, 3GPP TSG RAN WG2 Meeting #102 Busan, South Korea, May 25, 2018, Sections 2-4, 6 pages.

ZTE, Discussion on IAB node initial access process, 3GPP TSG RAN WG1 #93, R1-1806026, Busan, Korea, May 12, 2018, 11 pages.

Motorola Mobility, Further Details on the new RSSI Measurement Framework, 3GPP TSG-RAN WG2#92, R2-156642, Anaheim, U.S.A., Nov. 7, 2015, 7 pages.

* cited by examiner

1600

1602  1604

| Muting pattern index | × Muting SSB  √ : Normal SSB | | | | | | | |
|---|---|---|---|---|---|---|---|---|
| 0 | × | √ | √ | √ | √ | √ | √ | √ |
| 1 | √ | × | √ | √ | √ | √ | √ | √ |
| 2 | √ | √ | × | √ | √ | √ | √ | √ |
| 3 | √ | √ | √ | × | √ | √ | √ | √ |
| 4 | √ | √ | √ | √ | × | √ | √ | √ |
| 5 | √ | √ | √ | √ | √ | × | √ | √ |
| 6 | √ | √ | √ | √ | √ | √ | × | √ |
| 7 | √ | √ | √ | √ | √ | √ | √ | × |

| Muting pattern index | × Muting SSB<br>√ : Normal SSB | | | | | | | |
|---|---|---|---|---|---|---|---|---|
| 0 | √ | × | × | × | × | × | × | × |
| 1 | × | √ | × | × | × | × | × | × |
| 2 | × | × | √ | × | × | × | × | × |
| 3 | × | × | × | √ | × | × | × | × |
| 4 | × | × | × | × | √ | × | × | × |
| 5 | × | × | × | × | × | √ | × | × |
| 6 | × | × | × | × | × | × | √ | × |
| 7 | × | × | × | × | × | × | × | √ |

| Muting pattern index | × Muting SSB  √ : Normal SSB | | | | | | | |
|---|---|---|---|---|---|---|---|---|
| 0 | √ | × | √ | × | √ | × | √ | × |
| 1 | × | √ | × | √ | × | √ | × | √ |
| 2 | √ | √ | × | × | √ | √ | × | × |
| 3 | × | × | √ | √ | × | × | √ | √ |
| 4 | √ | √ | × | × | × | × | √ | √ |
| 5 | × | × | √ | √ | √ | √ | × | × |
| 6 | √ | √ | √ | √ | × | × | × | × |
| 7 | × | × | × | × | √ | √ | √ | √ |

| Muting pattern index | × Muting SSB  √ : Normal SSB | | | | | | | |
|---|---|---|---|---|---|---|---|---|
| 0 | √ | √ | √ | √ | √ | √ | × | × |
| 1 | × | × | √ | √ | √ | √ | √ | √ |
| 2 | √ | √ | × | × | √ | √ | √ | √ |
| 3 | √ | √ | √ | √ | × | × | √ | √ |
| 4 | √ | √ | √ | √ | √ | × | √ | × |
| 5 | √ | √ | √ | √ | × | √ | × | √ |
| 6 | √ | × | √ | × | √ | √ | √ | √ |
| 7 | × | √ | × | √ | √ | √ | √ | √ |

FIG.16D

METHOD AND APPARATUS FOR ALLOCATING MUTING RESOURCES FOR COMMUNICATIONS BETWEEN WIRELESS COMMUNICATION NODES

RELATED APPLICATIONS

This application is a continuation of U.S. patent application Ser. No. 17/071,204, filed Oct. 15, 2020, which is a 371 of International Application No. PCT/CN2018/096824, filed on Jul. 24, 2018, the contents of which are each incorporated by reference herein in their entireties.

TECHNICAL FIELD

This disclosure relates generally to wireless communications and, more particularly, to a method and apparatus for muting resource allocation in a wireless communication system.

BACKGROUND

Over the past few decades, mobile communications have evolved from voice services to high-speed broadband data services. With further development of new types of services and applications, e.g., enhanced mobile broadband (eMBB), massive Machine-Type Communication (mMTC), Ultra Reliability Low Latency Communication (URLLC), etc., the demands for high-performance data transmission on mobile networks will continue to increase exponentially. Based on specific requirements in these emerging services, wireless communication systems should meet a variety of requirements, such as throughput, latency, data rate, capacity, reliability, link density, cost, energy consumption, complexity, and coverage.

SUMMARY OF THE INVENTION

The exemplary embodiments disclosed herein are directed to solving the issues related to one or more problems presented in the prior art, as well as providing additional features that will become readily apparent by reference to the following detailed description when taken in systems, methods, and computer program products are disclosed herein. It is understood, however, that these embodiments are presented by way of example and not limitation, and it will be apparent to those of ordinary skill in the art who read the present disclosure that various modifications to the disclosed embodiments can be made while remaining within the scope of the invention.

In a heterogeneous network of a 4G-communication system, a macro cell is divided into multiple small cells, and a relay node (RN) in each of the small cells acts as a BS of the respective small cell for communicating with the BS of the macro cell as well as its UE terminals. The RN can also communicate with its upper RN's and lower RN's to form a multi-hop network. Such multi-hop heterogeneous network can provides advantages such as an improved gain and system capacity compared to a traditional network structure. In a 5G-communication system, integrated access and backhaul (IAB) technology can be used to support a multi-hop heterogeneous network, wherein the network-side communication node (BS) is an IAB donor, which can directly communicate with RN's in small cells, which are denoted as "IAB nodes" hereinafter in the present disclosure. Each IAB node can directly communicate with its UE terminals and/or its direct lower-level and higher-level IAB nodes. Specifically, an IAB node can receive uplink data from a lower-level IAB node or a UE terminal and transmit to its upper-level IAB node or the IAB donor. Similarly, an IAB node can also receive downlink data from its upper-level IAB node or the IAB donor and transmits to its lower-level IAB node or UE terminal. Therefore, an IAB node cannot directly access core network but have to go through an IAB donor. A communication channel between an IAB node and its upper-level IAB node may be disconnected at any time. At this moment, data transmission from UE's of the IAB nodes to the IAB donor can be greatly affected. To solve this problem, the IAB node can communicate with adjacent IAB nodes to identify backup upper-level IAB nodes, which can be used to establish a new communication channel when the original link is disconnected. This method can greatly reduce the interruption time during data transmission. Therefore, if adjacent IAB nodes are not known to the IAB node for the IAB node to use as a backup upper-level IAB node, an interruption of data transmission can potentially occur. This disclosure presents a method and apparatus for allocating muting resources to detect SSBs transmitted from adjacent IAB nodes. As used herein, a "muting resource" refers to a resource in the time and frequency domain on which an IAB node terminates its originally scheduled reference signals (e.g., synchronization signal (SS) and Physical Broadcast Channel (PBCH) blocks, Channel state information-reference signal (CSI-RS)) transmission and receives reference signals (e.g., SS and PBCH blocks, CSI-RS) transmitted from adjacent IAB nodes. In the following description, we take SSBs as an example of reference signals.

In one embodiment, a method performed by a first wireless communication node, includes: receiving at least one measurement resource from a second wireless communication node in a communication system; determining at least one overlapping resource between the at least one measurement resource and a first plurality of resource sets; and determining at least one muting resource set in the first plurality of resource sets, wherein the at least one muting resource set comprises the at least one overlapping resource.

Yet, in another embodiment, a method performed by a first wireless communication node, includes: transmitting at least one measurement resource to a second wireless communication node in a communication system for the second wireless communication node to determine at least one overlapping resource between the at least one measurement resource and a first plurality of resource set and further determine at least one muting resource set according to the at least one overlapping resource, wherein the at least one muting resource set comprises the at least one overlapping resource.

BRIEF DESCRIPTION OF THE DRAWINGS

Aspects of the present disclosure are best understood from the following detailed description when read with the accompanying figures. It is noted that various features are not necessarily drawn to scale. In fact, the dimensions and geometries of the various features may be arbitrarily increased or reduced for clarity of discussion.

FIGS. 16A-16D illustrate exemplary muting pattern tables with exemplary muting patterns, in accordance with some embodiments of the present disclosure.

DETAILED DESCRIPTION OF EXEMPLARY EMBODIMENTS

Figure 1A:
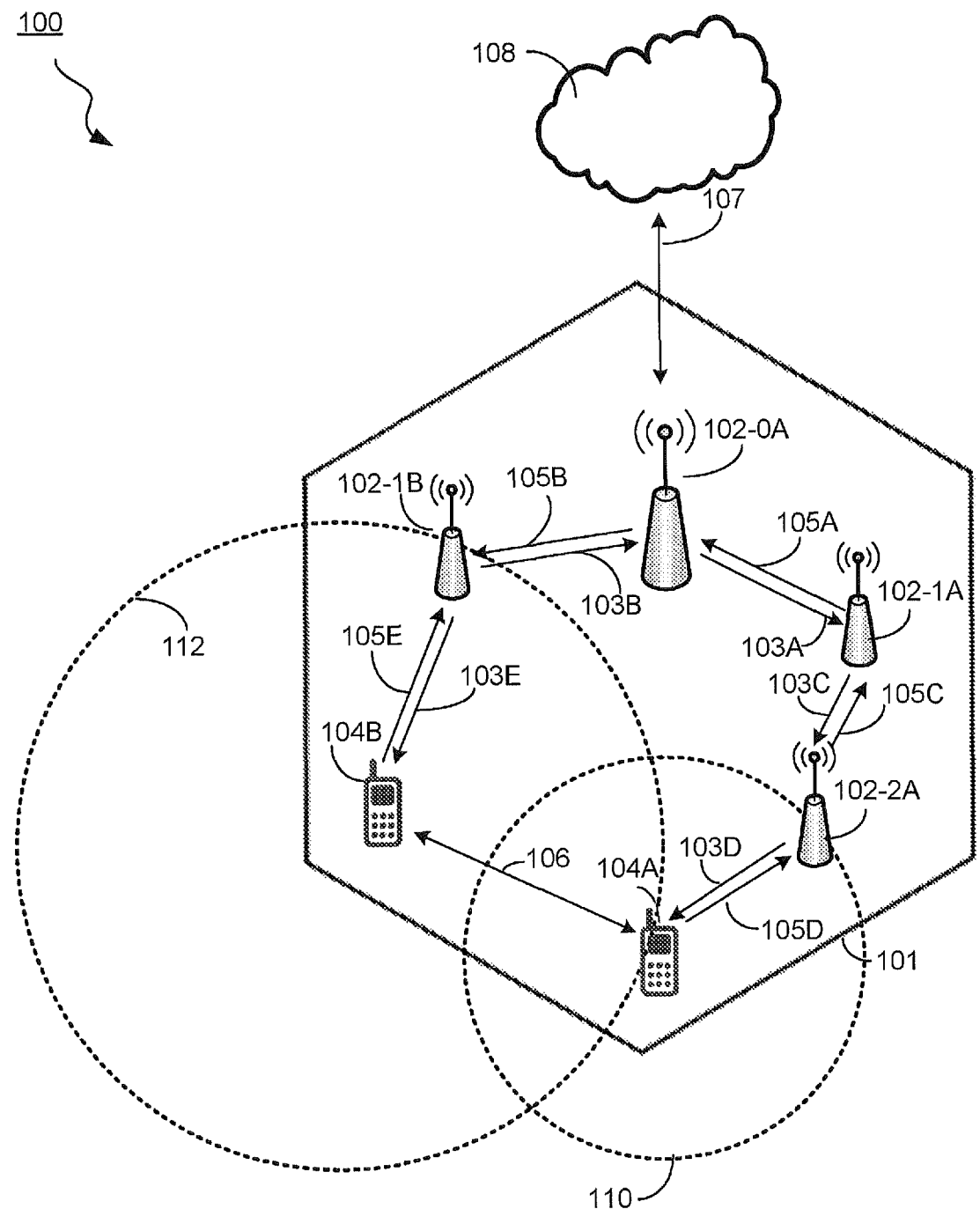
FIG. 1A illustrates an exemplary wireless communication network illustrating achievable modulation as a function of distance from a BS, in accordance with some embodiments of the present disclosure.

Various exemplary embodiments of the invention are described below with reference to the accompanying figures to enable a person of ordinary skill in the art to make and use the invention. As would be apparent to those of ordinary skill in the art, after reading the present disclosure, various changes or modifications to the examples described herein can be made without departing from the scope of the invention. Thus, the present invention is not limited to the exemplary embodiments and applications described or illustrated herein. Additionally, the specific order or hierarchy of steps in the methods disclosed herein are merely exemplary approaches. Based upon design preferences, the specific order or hierarchy of steps of the disclosed methods or processes can be re-arranged while remaining within the scope of the present invention. Thus, those of ordinary skill in the art will understand that the methods and techniques disclosed herein present various steps or acts in a sample order, and the invention is not limited to the specific order or hierarchy presented unless expressly stated otherwise.

Embodiments of the present invention are described in detail with reference to the accompanying drawings. The same or similar components may be designated by the same or similar reference numerals although they are illustrated in different drawings. Detailed descriptions of constructions or processes well-known in the art may be omitted to avoid obscuring the subject matter of the present invention. Further, the terms are defined in consideration of their functionality in embodiment of the present invention, and may vary according to the intention of a user or an operator, usage, etc. Therefore, the definition should be made on the basis of the overall content of the present specification.

FIG. 1A illustrates an exemplary wireless communication heterogeneous network 100, in accordance with some embodiments of the present disclosure. In a wireless communication system, a network-side communication node can be a node B, an E-utran Node B (also known as Evolved Node B, eNodeB or eNB), a gNodeB in new radio (NR) technology, a pico station, a femto station, or the like, which is referred to as "IAB donor 102-0" hereinafter in all the embodiments in this disclosure. A sub-cell side communication node can be a node B, an E-utran Node B (also known as Evolved Node B, eNodeB or eNB), a gNodeB in new radio (NR) technology, a pico station, a femto station, or the like, which is referred to as "IAB node 102-1, 102-2, . . . " hereinafter in all the embodiments in this disclosure. A terminal-side communication node can be a long range communication system like a mobile phone, a smart phone, a personal digital assistant (PDA), tablet, laptop computer, or a short range communication system such as, for example a wearable device, a vehicle with a vehicular communication system and the like, which is referred to as "UE 104" hereinafter in all the embodiments in this disclosure.

Such communication nodes may be capable of wireless and/or wired communications, in accordance with some embodiments of the invention. It is noted that all the embodiments are merely preferred examples, and are not intended to limit the present disclosure. Accordingly, it is understood that the system may include any desired combination of UE's 104, IAB nodes 102-1/102-2, and IAB donors 102-0, while remaining within the scope of the present disclosure.

Referring to FIG. 1A, the wireless communication heterogeneous network 100 includes an IAB donor 102-0A, two first-level IAB nodes 102-1A/102-1B, a second-level IAB node 102-2A, and two UE's 104a/104b, (collectively referred to as UE's 104 herein). The BS 102 and the UE's 104 are contained within a geographic boundary of cell 101. Although it is shown in the FIG. 1A, a first first-level IAB node 102-1A directly communicates with the second-level IAB node 102-2A and a second first-level IAB node 102-1B directly communicates with the UE 104b. Both of the first level IAB nodes 102-1A/102-1B directly communicate with the IAB donor 102-0A, it should be noted that any other network configurations are within the scope of this invention. For example, the IAB donor 102-0A, the first first-level IAB node 102-1A, the second first-level IAB node 102-1B, the second-level IAB node 102-2A can support direct communication with UEs in the corresponding small cells.

A wireless transmission from a transmitting antenna of the IAB node 102-1A to a receiving antenna of the IAB node 102-0A is known as an backhaul link transmission 105a, and a wireless transmission from a transmitting antenna of the IAB node 102-0A to a receiving antenna of the IAB node 102-1A is known as an access link transmission 103A. Similarly, a wireless transmission from a transmitting antenna of the IAB node 102-1B to a receiving antenna of the IAB node 102-0A is known as an backhaul link transmission 105b, and a wireless transmission from a transmitting antenna of the IAB node 102-0A to a receiving antenna of the IAB node 102-1B is known as an access link transmission 103b. A wireless transmission from a transmitting antenna of the IAB node 102-2A to a receiving antenna of the IAB node 102-1A is known as an backhaul link transmission 105C, and a wireless transmission from a transmitting antenna of the IAB node 102-1A to a receiving antenna of the IAB node 102-1B is known as an access link transmission 103A. A wireless transmission from a transmitting antenna of the UE 104A to a receiving antenna of the IAB node 102-2A is known as an uplink transmission 105D, and a wireless transmission from a transmitting antenna of the IAB node 102-2A to a receiving antenna of the UE 104A is known as a downlink transmission 103D. A wireless transmission from a transmitting antenna of the UE 104B to a receiving antenna of the IAB node 102-1B is known as an uplink transmission 105E, and a wireless transmission from a transmitting antenna of the IAB node 102-1B to a receiving antenna of the UE 104B is known as a downlink transmission 103E. In the illustrated embodiment, a wireless transmission between the antennas of UE 104A and UE 104B is known as sidelink transmission 106.

The UE 104B has a direct communication channel with the first-level IAB node 102-1B operating at a first frequency resource f1 (e.g., carrier or bandwidth part) for downlink communication 103E and a second frequency resource f2 for uplink communication 105E. Similarly, the UE 104A also has a direct communication channel with the second-level IAB node 102-2A operating at a third frequency resource f3 for downlink communication 103D and a fourth frequency resource f4 for uplink communication 105D. In some embodiments, the second frequency resource f2 and the fourth frequency resource f4 are different from the first frequency resource f1 and the third frequency resource D. In some embodiments, the second frequency resource f2 and the fourth frequency resource f4 are different from each other. Therefore, the second frequency resource f2 and the fourth frequency resource f4 have different transmission characteristics, such as for example path loss, coverage, maximum transmission power, etc. In some embodiments, the bandwidth of the first frequency resource f1, the second frequency resource f2, the third frequency resource f3 and the fourth frequency resource f4 can be also different. Although only 2 UE's 104A/104B are shown in FIG. 1A, it should be noted that any number of UE's 104 can be included in the cell 101 and are within the scope of this invention.

In some embodiments, the coverage of uplink communication 105E is larger than that of the uplink communication 105D, as indicated by dotted circles 112 and 110, respectively. The IAB nodes 102-1B and 102-2A are located within the region of the coverage areas 110 and 112 in order for the IAB nodes to perform uplink communication with the UE 104a and UE 104b in the cell 101.

The direct communication channels 105D/105E (uplink transmission) and 103D/103E (downlink transmission) between the UE 104B/104A and the corresponding IAB nodes 102-1B/102-2A can be through interfaces such as an Uu interface, which is also known as UMTS (Universal Mobile Telecommunication System (UMTS) air interface. The direct communication channels 105A/105B/105C (backhaul link transmission) and 103A/103B/103C (access link transmission) between the IAB node (i.e., 102-2A and 102-1A) and between the IAB nodes 102-1A/102-1B and IAB donor 102-0A can be through interfaces such as Un interface. The direct communication channels (i.e., sidelink transmission) 106 between the UE's can be through a PC5 interface, which is introduced to address high moving speed and high density applications such as Vehicle-to-Vehicle (V2V) communications. The BS 102 is connected to a core network (CN) 108 through an external interface 107, e.g., an Iu interface.

The UE's 104a and 104b obtains its synchronization timing from the corresponding IAB nodes 102-2A and 102-1B, which obtains its own synchronization timing further through the IAB donor 102-0A and further from the core network 108 through an internet time service, such as a public time NTP (Network Time Protocol) server or a RNC (Radio Frequency Simulation System Network Controller) server. This is known as network-based synchronization. Alternatively, the IAB donor 102-0A can also obtain synchronization timing from a Global Navigation Satellite System (GNSS) (not shown) through a satellite signal 106, especially for a large IAB donor in a large cell which has a direct line of sight to the sky, which is known as satellite-based synchronization.

Figure 1B:
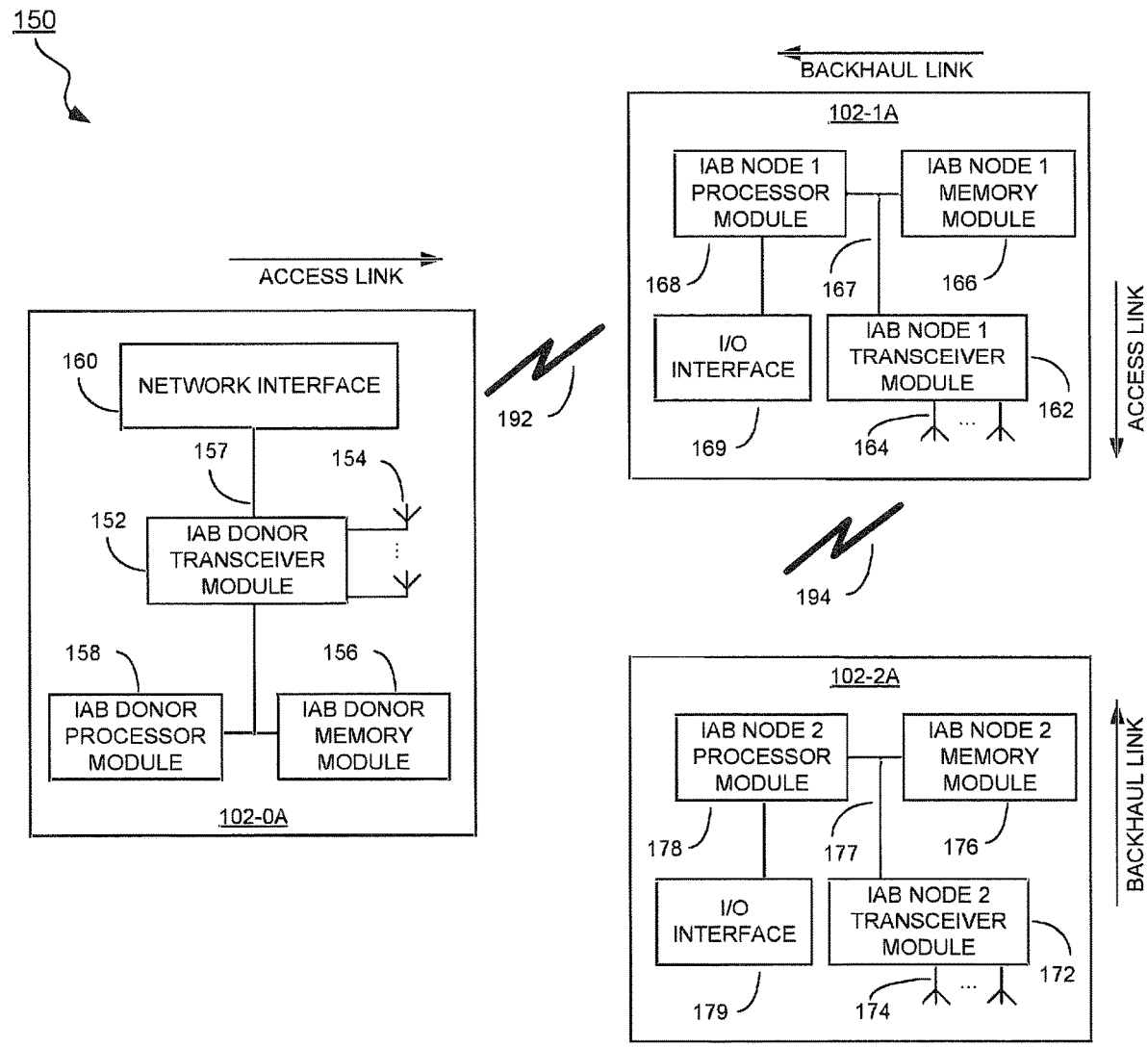
FIG. 1B illustrates a block diagram of an exemplary wireless communication system for a slot structure information indication, in accordance with some embodiments of the present disclosure.

FIG. 1B illustrates a block diagram of an exemplary wireless communication system 150, in accordance with some embodiments of the present disclosure. The system 150 may include components and elements configured to support known or conventional operating features that need not be described in detail herein. In one exemplary embodiment, system 150 can be used to transmit and receive data symbols in a wireless communication environment such as the wireless communication network 100 of FIG. 1A, as described above.

System 150 generally includes 1 IAB donor 102-0A, 1 first-level IAB node 102-1A, and 1 second-level IAB node 102-2A. The IAB donor 102-0A includes an IAB donor transceiver module 152, an IAB donor antenna array 154, an IAB donor memory module 156, an IAB donor processor module 158, and a Network interface 160, each module being coupled and interconnected with one another as necessary via a data communication bus 157. The first-level IAB node 102-1A includes an IAB node 1 transceiver module 162, an IAB node 1 antenna 164, an IAB node 1 memory module 166, an IAB node 1 processor module 168, and an input/output (I/O) interface 169, each module being coupled and interconnected with one another as necessary via a date communication bus 167. The second-level IAB node 102-2A includes an IAB node 2 transceiver module 172, an IAB node 2 antenna 174, an IAB node 1 memory module 176, an IAB node 1 processor module 178, and an input/output (I/O) interface 179, each module being coupled and interconnected with one another as necessary via a date communication bus 177. The IAB donor 102-0A communicates with the IAB node 102-1A via a communication channel 192, which can be any wireless channel or other medium known in the art suitable for transmission of data as described herein. The first-level IAB node 102-1A communicates with the second-level IAB node 102-2A via communication channel 194, which can be any wireless channel or other medium known in the art suitable for transmission of data as described herein.

As would be understood by persons of ordinary skill in the art, system 150 may further include any number of blocks, modules, circuits, etc. other than those shown in FIG. 1B. Those skilled in the art will understand that the various illustrative blocks, modules, circuits, and processing logic described in connection with the embodiments disclosed herein may be implemented in hardware, computer-readable software, firmware, or any practical combination thereof. To clearly illustrate this interchangeability and compatibility of hardware, firmware, and software, various illustrative components, blocks, modules, circuits, and steps are described generally in terms of their functionality. Whether such functionality is implemented as hardware, firmware, or software depends upon the particular application and design constraints imposed on the overall system. Those familiar with the concepts described herein may implement such functionality in a suitable manner for each particular application, but such implementation decisions should not be interpreted as limiting the scope of the present invention.

A wireless transmission from a transmitting antenna of the IAB donor 102-0A to a receiving antenna of the first-level IAB 102-1A is known as an access link transmission, and a wireless transmission from a transmitting antenna of the first-level IAB node 102-1A to a receiving antenna of the IAB donor 102-0A is known as a backhaul link transmission. In accordance with some embodiments, a IAB donor transceiver 162 may be referred to herein as an "backhaul link" transceiver 162 that includes a RF transmitter and receiver circuitry that are each coupled to the IAB node 1 antenna 164. A duplex switch (not shown) may alternatively couple the uplink transmitter or receiver to the uplink antenna in time duplex fashion. Similarly, in accordance with some embodiments, the IAB donor transceiver 152 may be referred to herein as a "downlink" transceiver 152 that includes RF transmitter and receiver circuitry that are each coupled to the IAB donor antenna array 154. A downlink duplex switch may alternatively couple the downlink transmitter or receiver to the downlink antenna array 154 in time duplex fashion. The operations of the two transceivers 152 and 162 are coordinated in time such that the uplink receiver is coupled to the uplink IAB node 1 antenna 164 for reception of transmissions over the wireless communication channel 192 at the same time that the downlink transmitter is coupled to the downlink antenna array 154. Preferably, there is close synchronization timing with only a minimal guard time between changes in duplex direction. The IAB node 1 transceiver 162 communicates through the IAB node 1 antenna 164 with the IAB donor 102-0A via the wireless communication channel 192 or with the second-level IAB node 102-2A via the wireless communication channel 194. The wireless communication channel 194 can be any wireless channel or other medium known in the art suitable for wireless transmission of data as described herein.

The IAB node 1 transceiver 162 and the IAB donor transceiver 152 are configured to communicate via the wireless data communication channel 192, and cooperate with a suitably configured RF antenna arrangement 154/164 that can support a particular wireless communication protocol and modulation scheme. In some embodiments, the IAB donor transceiver 152 is configured to transmit muting resource configuration parameters to the IAB node 1 transceiver 162. In some embodiments, the IAB node 1 transceiver 162 is configured to receive the muting resource configuration parameters from the IAB donor transceiver 152 and/or receive the SSBs from neighboring IAB nodes so as to detect neighboring IAB nodes. In some exemplary embodiments, the IAB node 1 transceiver 162 and the IAB donor transceiver 152 are configured to support industry standards such as the Long Term Evolution (LTE) and emerging 5G standards, and the like. It is understood, however, that the invention is not necessarily limited in application to a particular standard and associated protocols. Rather, the IAB node 1 transceiver 162 and the IAB donor transceiver 152 may be configured to support alternate, or additional, wireless data communication protocols, including future standards or variations thereof.

The IAB donor processor modules 158, and IAB node processor modules 168/178 are implemented, or realized, with a general purpose processor, a content addressable memory, a digital signal processor, an application specific integrated circuit, a field programmable gate array, any suitable programmable logic device, discrete gate or transistor logic, discrete hardware components, or any combination thereof, designed to perform the functions described herein. In this manner, a processor may be realized as a microprocessor, a controller, a microcontroller, a state machine, or the like. A processor may also be implemented as a combination of computing devices, e.g., a combination of a digital signal processor and a microprocessor, a plurality of microprocessors, one or more microprocessors in conjunction with a digital signal processor core, or any other such configuration.

Then, the IAB node 1 processor module 168 detects the PHR triggering message on the IAB node 1 transceiver module 162, the IAB node processor module 168 is further configured to determine at least one muting resource based on at least one predefined criteria and the received at least one muting resource configuration from the IAB donor 102-0A, wherein the at least one predefined algorithm is selected based on other parameters calculated or messages received which will be further discussed in detail below. The IAB node 1 processor module 168 is further configured to instruct the IAB node 1 transceiver module 162 to receive a SSB from and to transmit its scheduled SSBs to neighboring IAB nodes at a determined muting configuration.

Furthermore, the steps of a method or algorithm described in connection with the embodiments disclosed herein may be embodied directly in hardware, in firmware, in a software module executed by corresponding processor modules 158/ 168/178, respectively, or in any practical combination thereof. The memory modules 156/166/176 may be realized as RAM memory, flash memory, ROM memory, EPROM memory, EEPROM memory, registers, a hard disk, a removable disk, a CD-ROM, or any other form of storage medium known in the art. In this regard, the memory modules 156 and 166 may be coupled to the processor modules 158 and 168, respectively, such that the processors modules 158 and 168 can read information from, and write information to, memory modules 156/166/176, respectively. The memory modules 156/166/176 may also be integrated into their respective processor modules 158/168/178. In some embodiments, the memory modules 156/166/176 may each include a cache memory for storing temporary variables or other intermediate information during execution of instructions to be executed by processor modules 158/168/178, respectively. Memory modules 156/166/176 may also each include non-volatile memory for storing instructions to be executed by the processor modules 158/168/178, respectively.

The network interface 160 generally represents the hardware, software, firmware, processing logic, and/or other components of the IAB donor 102-0A that enable bi-directional communication between the IAB donor transceiver 152 and other network components and communication nodes configured to communication with the IAB donor 102-0A. For example, network interface 160 may be configured to support internet or WiMAX traffic. In a typical deployment, without limitation, network interface 160 provides an 802.3 Ethernet interface such that IAB donor transceiver 152 can communicate with a conventional Ethernet based computer network. In this manner, the network interface 160 may include a physical interface for connection to the computer network (e.g., Mobile Switching Center (MSC)). The terms "configured for" or "configured to" as used herein with respect to a specified operation or function refers to a device, component, circuit, structure, machine, signal, etc. that is physically constructed, programmed, formatted and/or arranged to perform the specified operation or function. The network interface 160 could allow the IAB donor 102-0A to communicate with other IAB donors, IAB nodes, or core network over a wired or wireless connection.

Referring again to FIG. 1A, as mentioned above, the IAB donor 102-0A repeatedly broadcasts system information associated with the IAB donor 102-0A directly to one or more UE's 104 and/or to one or more first-level IAB nodes so as to allow the UE 104 to access the network through IAB nodes/donor within the cell 101 where the IAB donor 102-0A is located, and in general, to operate properly within the cell 101. Plural information such as, for example, downlink and uplink cell bandwidths, downlink and uplink configuration, configuration for random access, etc., can be included in the system information, which will be discussed in further detail below. Typically, the IAB donor 102-0A broadcasts a first signal carrying some major system information, for example, configuration of the cell 101 through a PBCH (Physical Broadcast Channel). For purposes of clarity of illustration, such a broadcasted first signal is herein referred to as "first broadcast signal." It is noted that the BS 102 may subsequently broadcast one or more signals carrying some other system information through respective channels (e.g., a Physical Downlink Shared Channel (PDSCH)), which are herein referred to as "second broadcast signal," "third broadcast signal," and so on.

Referring again to FIG. 1B, in some embodiments, the major system information carried by the first broadcast signal may be transmitted by the IAB donor 102-0A to the first-level IAB node 102-1A in a symbol format via the communication channel 192. In some embodiments, the major system information may comprise muting resource configuration parameters. In some embodiments, the muting resource configuration parameters can be also transmitted by the first broadcast signal by a first-level IAB node (102-1A) to a second-level IAB node (102-2A). In accordance with some embodiments, an original form of the major system information may be presented as one or more sequences of digital bits and the one or more sequences of digital bits may be processed through plural steps (e.g., coding, scrambling, modulation, mapping steps, etc.), all of which can be processed by the IAB donor processor module 158, to become the first broadcast signal. Similarly, when the IAB node 102-1A receives the first broadcast signal (in the symbol format) using the IAB node 1 transceiver 162, in accordance with some embodiments, the IAB node 1 processor module 168 may perform plural steps (de-mapping, demodulation, decoding steps, etc.) to estimate the major system information such as, for example, bit locations, bit numbers, etc., of the bits of the major system information. The IAB node 1 processor module 168 is also coupled to the I/O interface 169, which provides the IAB node 102-1A with the ability to connect to other devices such as computers. The I/O interface 169 is the communication path between these accessories and the IAB node 1 processor module 168.

Figure 2:
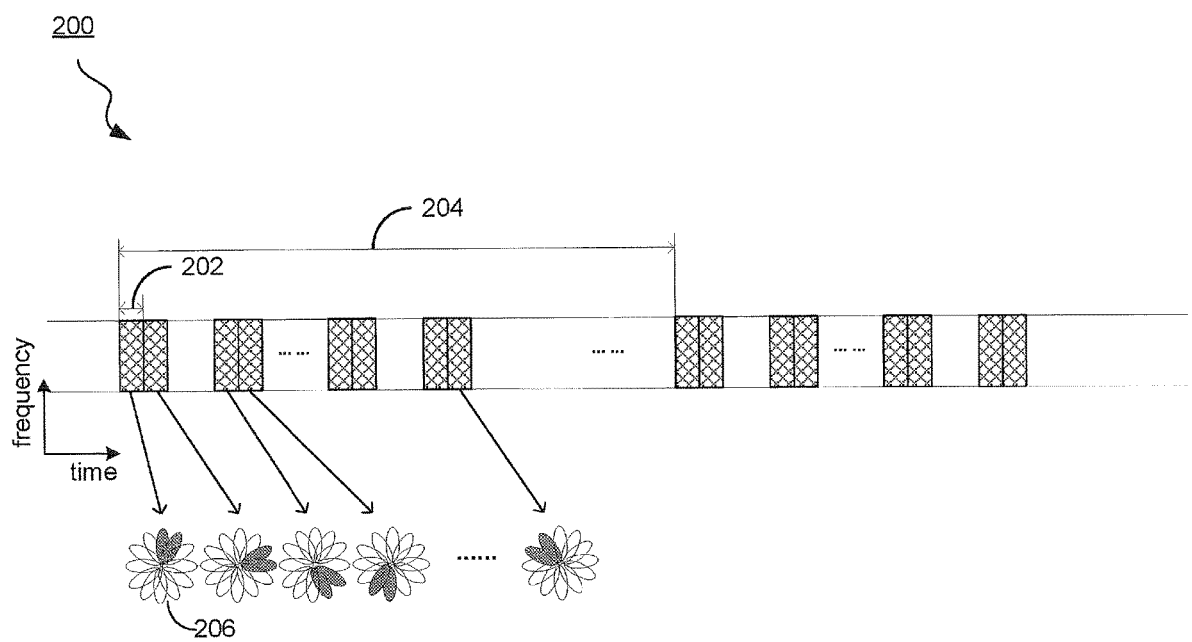
FIG. 2 illustrates a schematic of a radio frame structure with a plurality of synchronization signal blocks (SSBs), in accordance with some embodiments of the present disclosure.

FIG. 2 illustrates a schematic of a radio frame structure 200 with a plurality of synchronization signal blocks (SSBs) 202, in accordance with some embodiments of the present disclosure. A SSB is used to carry resource information in the time-frequency domain for access-related signals including synchronization signal, physical broadcast channel (PBCH), corresponding demodulation reference signal (DMRS), etc. In the illustrated embodiment, a plurality of SSBs can be grouped together to form a SSB burst set 204. The plurality of SSBs 202 in a SSB burst set 204 each carriers synchronization signals for a specific beam/port or a specific set of beams/ports 206. A complete beam-sweeping can be performed with in a SSB burst set 204, i.e., transmitting all the beams/ports in a SSB burst set. A SSB can also comprise PBCH and corresponding DMRS, other control channel, data channel, etc. In some embodiments, a plurality of SSBs can be grouped together into a SS burst set. Such structure is used for transmitting synchronization signals, and sweeping resources on the physical broadcast channel (PBCH). The plurality of SSBs of the SS burst set each carries a synchronization single of specific beams and/or ports. Beams/ports are transmitted after performing a beam sweeping on a SS burst set. In some embodiments, a SSB also comprises PBCH, corresponding DMRS and other control channel, data channel, etc. In some embodiments, when a plurality of SSBs are mapped to a same subframe or time slot, offsets of different SSBs relative to the edge of the subframe or the time slot are different. UE's located at different position in a cell can detect synchronization signal in a SSB. Time index of the SSBs which the UE 104 is synchronized to is required so as to achieve subframe timing and slot timing.

Figure 3:
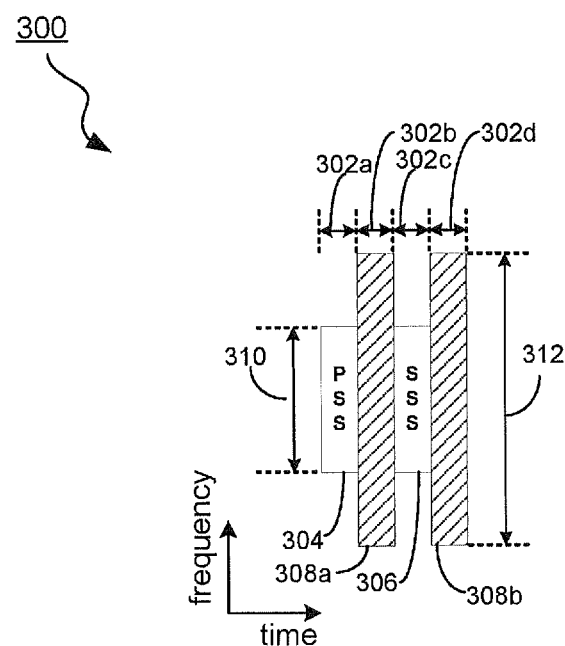
FIG. 3 illustrates a schematic of a SSB structure, in accordance with some embodiments of the present disclosure.

FIG. 3 illustrates a schematic of a SSB structure 300, in accordance with some embodiments of the present disclosure. In some embodiments, the SSB is used to carry signals and channels for initial accessing, for example, synchronization signals, physical broadcast channel and corresponding demodulation reference signal (DMRS), etc. In some embodiments, a SSB comprises 4 OFDM (orthogonal frequency-division multiplexing) symbols, i.e., a first OFDM symbol 302a, a second OFDM symbol 302b, a third OFDM symbol 302c, and a fourth OFDM symbol 302d. In some embodiments, on the first and third OFDM symbols 302a/302c, a primary synchronization signal (PSS) 304 and secondary synchronization signal (SSS) 306 are carried, respectively. In the illustrated embodiment, the PBCH 308a/308b can be transmitted on the second and fourth OFDM symbols 302b/302d, respectively. In some embodiment, the PSS/SSS 304/306 occupies 12 physical resource blocks (PRB's) 310 and the PBCH occupies 24 PRB's 312 in the frequency domain.

Figure 4:
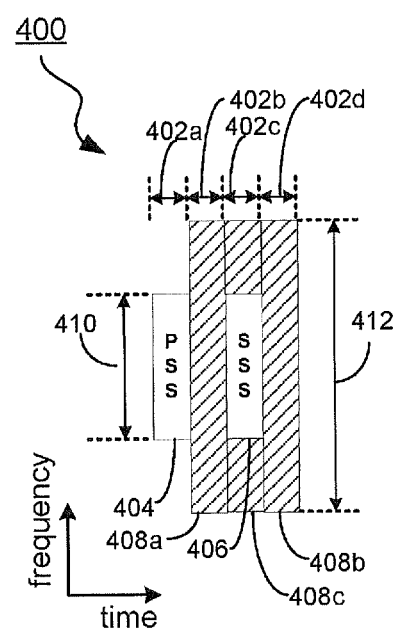
FIG. 4 illustrates a schematic of a SSB structure, in accordance with some embodiments of the present disclosure.

FIG. 4 illustrates a schematic of a SSB structure 410, in accordance with some embodiments of the present disclosure. In some embodiments, the SS/PHCH block is used to carry signals and channels for initial accessing, for example, synchronization signals, physical broadcast channel and corresponding demodulation reference signal (DMRS), etc. In some embodiments, a SS/PBCH block comprises 4 OFDM (orthogonal frequency-division multiplexing) symbols, i.e., a first OFDM symbol 402a, a second OFDM symbol 402b, a third OFDM symbol 402c, and a fourth OFDM symbol 402d. In some embodiments, on the first and third OFDM symbols 402a/402c, a primary synchronization signal (PSS) 404 and secondary synchronization signal (SSS) 406 are carried, respectively. In the illustrated embodiment, the PBCH 408a/408b can be transmitted on the second and fourth OFDM symbols 402b/402d, respectively, and the PBCH 408c is transmitted on the third OFDM symbol. In some embodiment, the PSS/SSS 404/406 occupies 12 physical resource blocks (PRB's) 410 and the PBCH 408a/408b on the second and fourth OFDM symbols 402b/402d occupies 20 PRB's 412 in the frequency domain. The PBCH 408c on the third OFDM symbol 402c occupies 8 PRB's. Specifically, the PBCH 408c occupies 4 PRB's on each side of the SSS 406 on the third OFDM symbol 402c.

Figure 5:
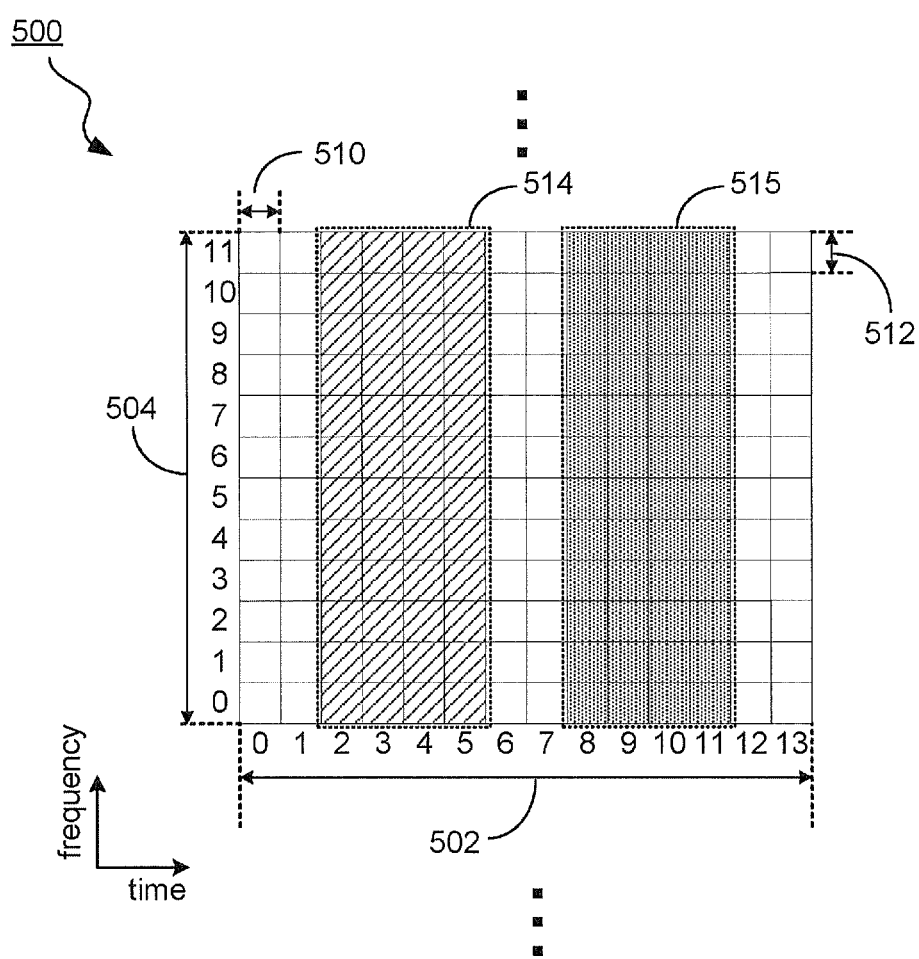
FIG. 5 illustrates a schematic of a SSB mapping pattern in a resource block, in accordance with some embodiment of the present disclosure.

FIG. 5 illustrates a schematic of a SSB mapping pattern 500 in a resource block, in accordance with some embodiment of the present disclosure. In the illustrated embodiment, a resource block (RB) 504 occupies a time slot 502, which form 1 resource block 504 with 12 subcarriers 512 in the frequency domain. The time slot 502 in a subcarrier 512 comprises 14 OFDM symbols 510. In the illustrated embodiment, the subcarrier 512 has a frequency of 15 kHz. There are 2 SSBs 514/515 in the time slot 502, and each of the 2 SSBs 514/515 occupies 4 OFDM symbols. Specifically, the first SSB 514 occupies symbols 2, 3, 4, and 5; and the second SSB 515 occupies symbols 8, 9, 10, and 11. The first SSB 514 and second SSB 515 may occupy 12 subcarriers 512 in a PRB 504. It should be noted that although the SSBs illustrated occupies 1 PRB 504, this is not intended to be limiting. Any numbers of PRB's in the frequency domain that are occupied by a SSB are within the scope of this present disclosure.

Figure 6:
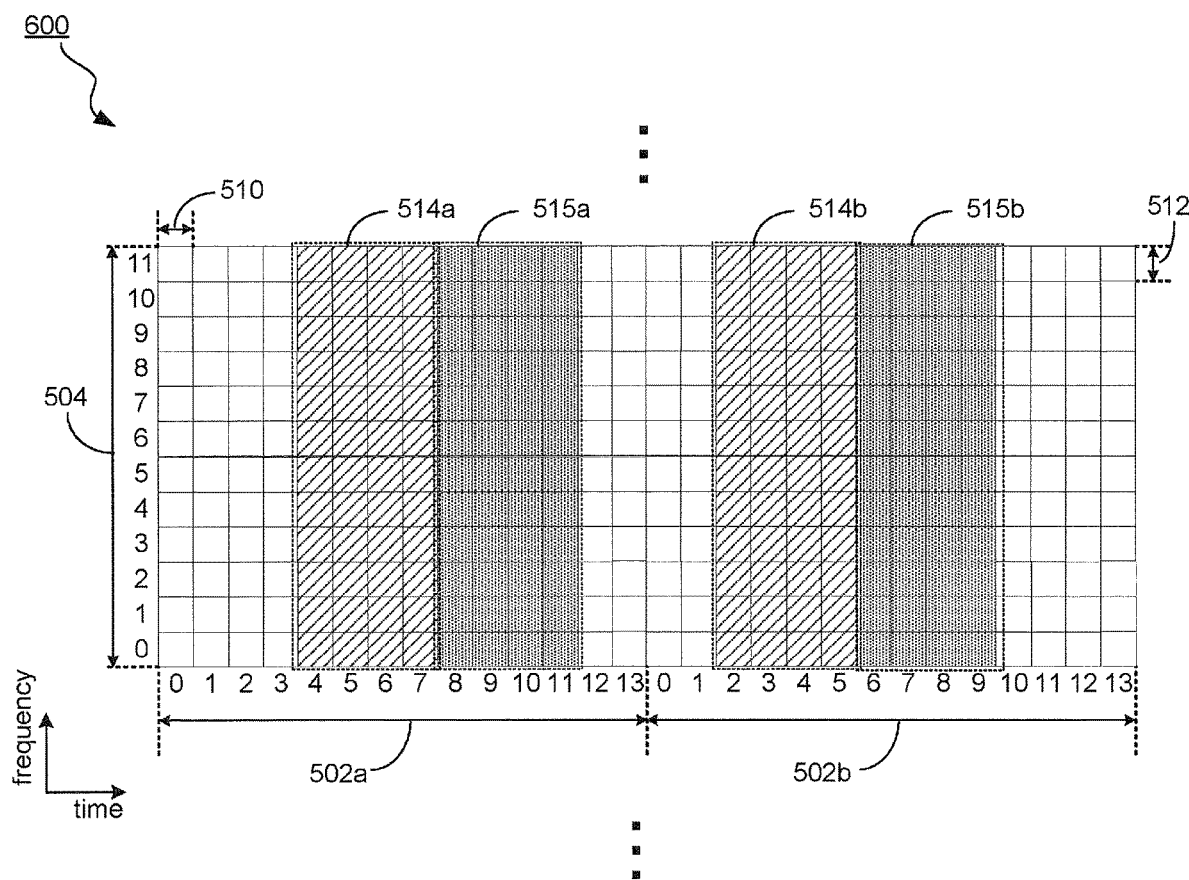
FIG. 6 illustrates a schematic of a SSB mapping pattern in a resource block, in accordance with some embodiment of the present disclosure.

FIG. 6 illustrates a schematic of a SSB mapping pattern 600 in a resource block, in accordance with some embodiment of the present disclosure. In the illustrated embodiment, a resource block (RB) 504 occupies two time slots, a first time slot 502a and a second time slot 502b. The RB 504 comprises 12 subcarriers 512 in the frequency domain. Each of the two time slots 502a and 502b in a subcarrier 512 comprises 14 OFDM symbols 510. In the illustrated embodiment, the subcarrier 512 has a frequency of 30 kHz. There are 2 SSBs 514/515 in the time slot 502, and each of the two SSBs 514/515 occupies 4 SC-OFDM symbols. Specifically, the first SSB 514a of the first time slot 502a occupies symbols 4, 5, 6, and 7; and the second SSB 515a of the first time slot 502a occupies symbols 8, 9, 10, and 11.

The first SSB 514b of the second time slot 502b occupies symbols 2, 3, 4, and 5; and the second SSB 515b of the second time slot 502b occupies symbols 6, 7, 8, and 9. The first SSBs 514a/514b and second SSBs 515a/515b of the first and the second time slots 502a/502b further occupy 12 subcarriers 512 in a PRB 504. It should be noted that although the SSBs illustrated occupies 1 PRB 504, this is not intended to be limiting. Any numbers of PRB's in the frequency domain that are occupied by a SSB are within the scope of this present disclosure.

Figure 7:
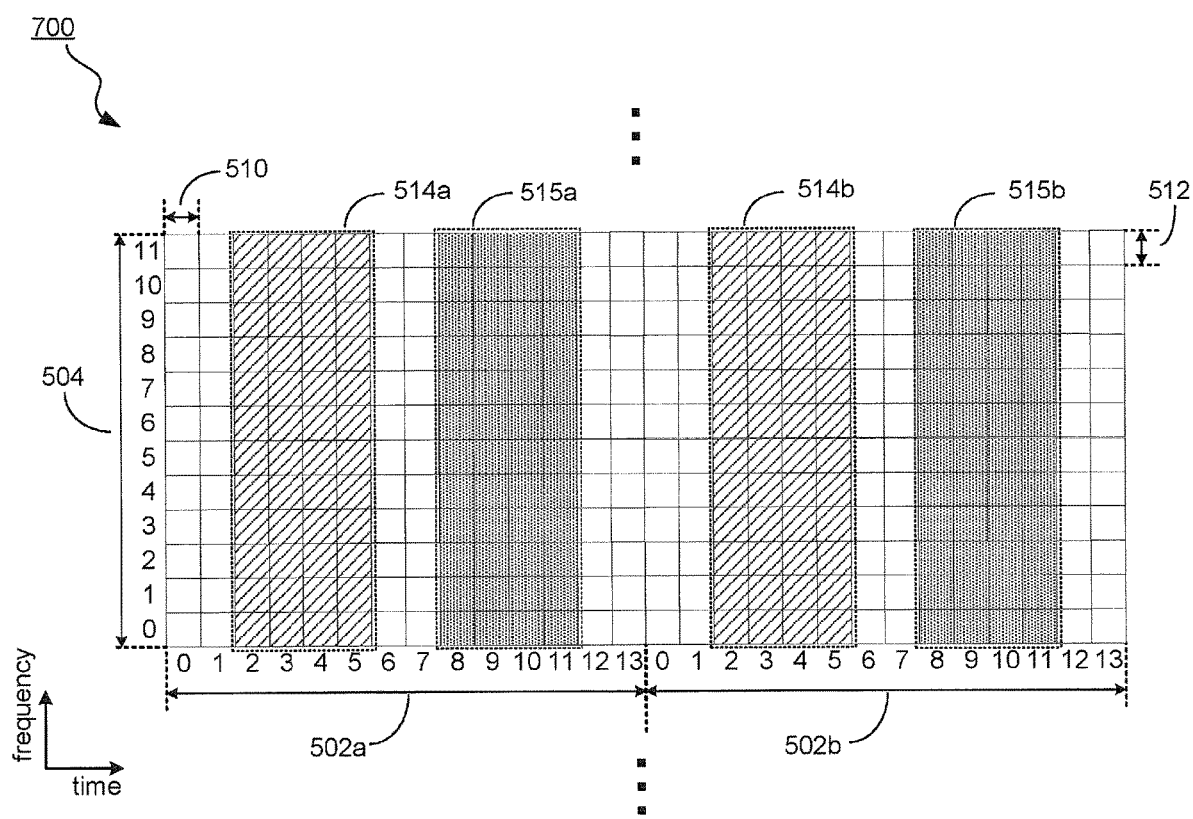
FIG. 7 illustrates a schematic of a SSB mapping pattern in a resource block, in accordance with some embodiment of the present disclosure.

FIG. 7 illustrates a schematic of a SSB mapping pattern 700 in a resource block, in accordance with some embodiment of the present disclosure. In the illustrated embodiment, a resource block (RB) 504 occupies two time slots, a first time slot 502a and a second time slot 502b. The RB 504 comprises 12 subcarriers 512 in the frequency domain. Each of the two time slots 502a and 502b in a subcarrier 512 comprises 14 OFDM symbols 510. In the illustrated embodiment, the subcarrier 512 has a frequency of 30 kHz. There are 2 SSB 514/515 in the time slot 502, and each of the two SSBs 514/515 occupies 4 SC-OFDM symbols. Specifically, the first SSB 514a of the first time slot 502a occupies symbols 2, 3, 4, and 5; and the second SSB 515a of the first time slot 502a occupies symbols 8, 9, 10, and 11. The first SSB 514b of the second time slot 502b occupies symbols 2, 3, 4, and 5; and the second SSB 515b of the second time slot 502b occupies symbols 8, 9, 10, and 11. The first SSBs 514a/514b and second SSBs 515a/515b of the first and the second time slots 502a/502b further occupy 12 subcarriers 512 in a PRB 504. It should be noted that although the SSB illustrated occupies 1 PRB 504, this is not intended to be limiting. In some other embodiments, the SSBs 514a, 514b, 514c and 514d occupy a plurality of PRB's 504. In some embodiments, the SSBs occupy 20 PRB's 504. Any numbers of PRB's in the frequency domain that are occupied by the SSB system are within the scope of this present disclosure.

Figure 8:
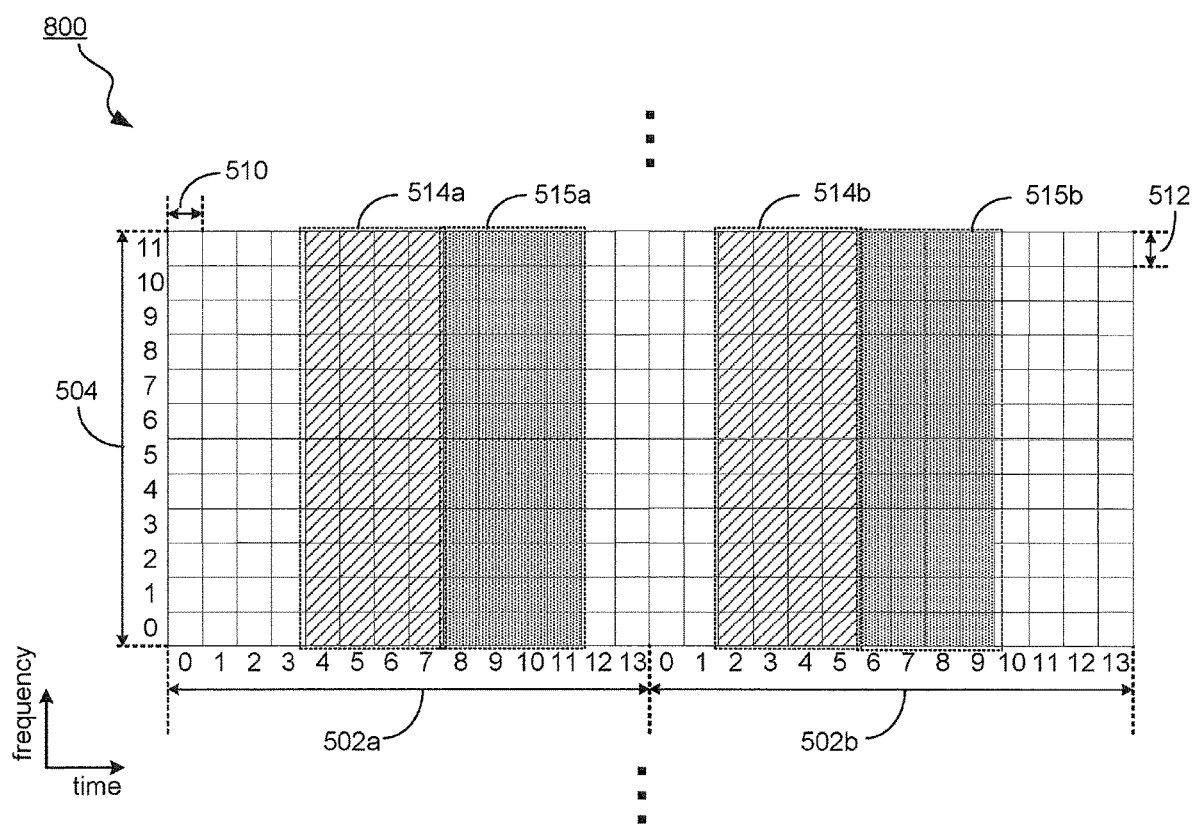
FIG. 8 illustrates a schematic of a SSB mapping pattern in a resource block, in accordance with some embodiment of the present disclosure.

FIG. 8 illustrates a schematic of a SSB mapping pattern 800 in a resource block, in accordance with some embodiment of the present disclosure. In the illustrated embodiment, a resource block (RB) 504 occupies two time slots, a first time slot 502a and a second time slot 502b. The RB 504 comprises 12 subcarriers 512 in the frequency domain. Each of the two time slots 502a and 502b in a subcarrier 512 comprises 14 OFDM (orthogonal frequency division multiplexing) symbols 510. In the illustrated embodiment, the subcarrier 512 has a frequency of 120 kHz. There are 2 SSBs 514/515 in the time slot 502, and each of the two SSBs 514/515 occupies 4 SC-OFDM symbols. Specifically, the first SSB 514a of the first time slot 502a occupies symbols 4, 5, 6, and 7; and the second SSB 515a of the first time slot 502a occupies symbols 8, 9, 10, and 11. The first SSB 514b of the second time slot 502b occupies symbols 2, 3, 4, and 5; and the second SSB 515b of the second time slot 502b occupies symbols 6, 7, 8, and 9. The first SSBs 514a/514b and second SSBs 515a/515b of the first and the second time slots 502a/502b further occupy 12 subcarriers 512 in a PRB 504. It should be noted that although the SSBs illustrated occupies 1 PRB 504, this is not intended to be limiting. In some other embodiments, the SSBs 514a, 514b, 514c and 514d occupy a plurality of PRB's 504. In some embodiments, the SSBs occupy 20 PRB's 504. Any numbers of PRB's in the frequency domain that are occupied by the SSBs are within the scope of this present disclosure.

Figure 9:
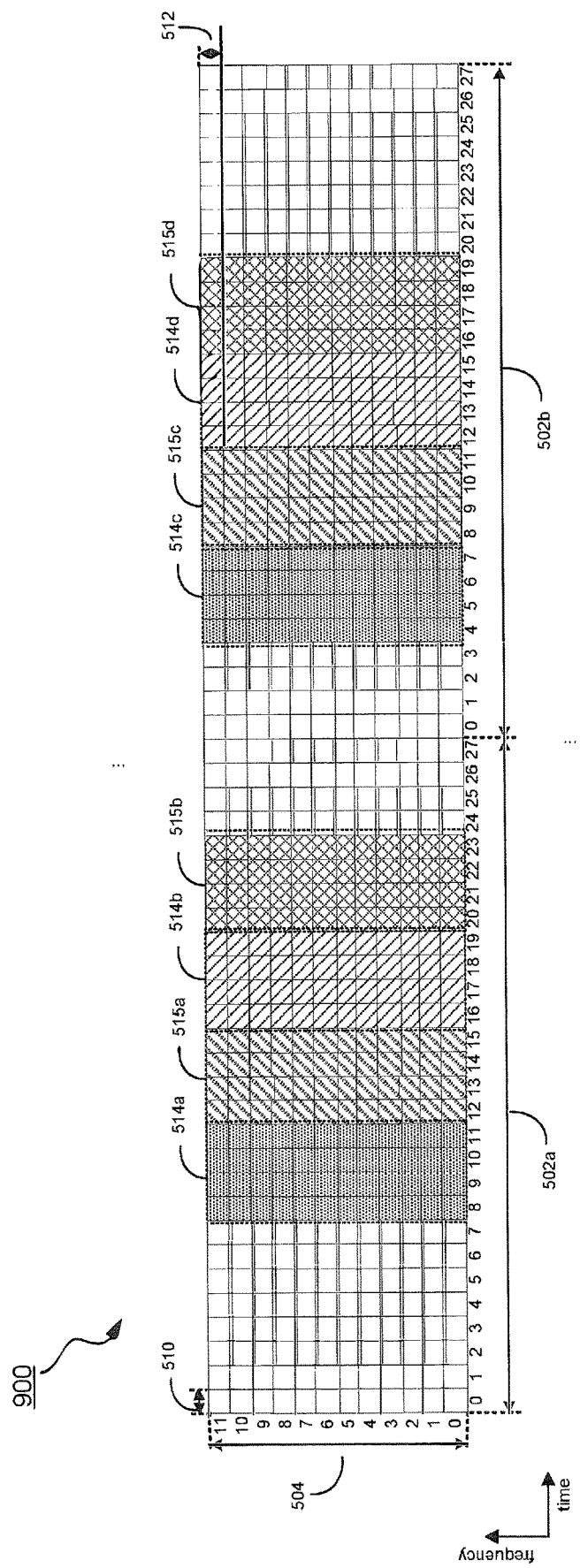
FIG. 9 illustrates a schematic of a SSB mapping pattern in a resource block, in accordance with some embodiment of the present disclosure.

FIG. 9 illustrates a schematic of a SSB mapping pattern 900 in a resource block, in accordance with some embodiment of the present disclosure. In the illustrated embodiment, a resource block (RB) 504 occupies two time slots, a first time slot 502a and a second time slot 502b. The RB 504 comprises 12 subcarriers 512 in the frequency domain. Each of the two time slots 502a and 502b in a subcarrier 512 comprises 28 OFDM symbols 510. In the illustrated embodiment, the subcarrier 512 has a frequency of 240 kHz. There are 4 SSBs 514/515 in the time slot 502, and each of the 4 SSBs 514/515 occupies 4 SC-OFDM symbols. Specifically, the first SSB 514a of the first time slot 502a occupies symbols 8, 9, 10, and 11; the second SSB 515a of the first time slot 502a occupies symbols 12, 13, 14 and 15; the third SSB 514b of the first time slot 502a occupies symbols 16, 17, 18, and 19; and the fourth SSB 515b of the first time slot 502a occupies symbols 20, 21, 22, and 23. The first SSB 514c of the second time slot 502b occupies symbols 4, 5, 6, and 7; the second SSB 515c of the second time slot 502b occupies symbols 8, 9, 10, and 11; the third SSB 514d of the second time slot 502b occupies symbols 12, 13, 14, and 15; and the fourth SSB 515d of the second time slot 502b occupies symbols 16, 17, 18, and 19. The four SSBs 514a/515a/514b/515b of the first time slot 502a and the four SSBs 514c/515c/514d/515d of the first time slot 502b further occupy 12 subcarriers 512 in a PRB 504. It should be noted that although the eight SSBs illustrated occupies 1 PRB 504, this is not intended to be limiting. In some other embodiments, the SSBs 514a/515a, 514b/515b, 514c/515c, and 514d/515d occupy a plurality of PRB's 504. In some embodiments, the SSBs occupy 20 PRB's 504. Any numbers of PRB's in the frequency domain that are occupied by the SSBs are within the scope of this present disclosure.

FIG. 10A-10F illustrates schematics of radio frame structures 1000 with a plurality of synchronization signal blocks (SSB) 202 in a half radio frame of 5 milliseconds (ms), in accordance with some embodiments of the present disclosure. A maximum number of SSBs is 4 when the frequency is less than or equal to 3 gigaHertz (GHz), the maximum number of SSBs is 8 when the frequency is in a range between 3 and 6 GHz, and the maximum number of SSBs is 64 when the frequency is in greater or equal to 6 GHz.

Figure 10A:
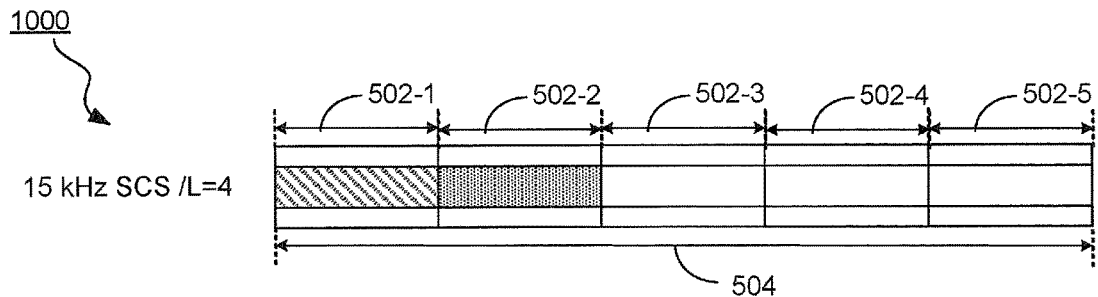
FIG. 10A illustrates a schematic of a half radio frame structure with 2 time slots in a subcarrier spacing of 15 kHz for SSB transmission in a half radio frame of 5 ms, in accordance with some embodiments of the present disclosure.

FIG. 10A illustrates a schematic of a half radio frame structure 1000 with 2 time slots 502 in a subcarrier spacing of 15 kHz for SSB transmission in a half radio frame 504 of 5 ms, in accordance with some embodiments of the present disclosure. In some embodiments, the subcarrier spacing (SCS) is 15 kHz and the maximum number of SSBs is 4. One time slot in the half radio frame of 5 ms can carry 2 SSBs and comprise 14 symbols. Since there are two SSBs in a time slot 502 and each of the two time slots occupies 1 ms, a maximum number of 2 time slots and 4 SSBs are required in a half-frame of 5 ms. In the illustrated embodiment, first two times slots 502-1/502-2 each comprises 2 SSBs. It should be noted that the time slot with SSBs can occupy any 2 times slots in the half-frame of 5 ms and each SSB can occupy any 4 continuous symbols in the time slot, as discussed above in FIGS. 3-7.

Figure 10B:
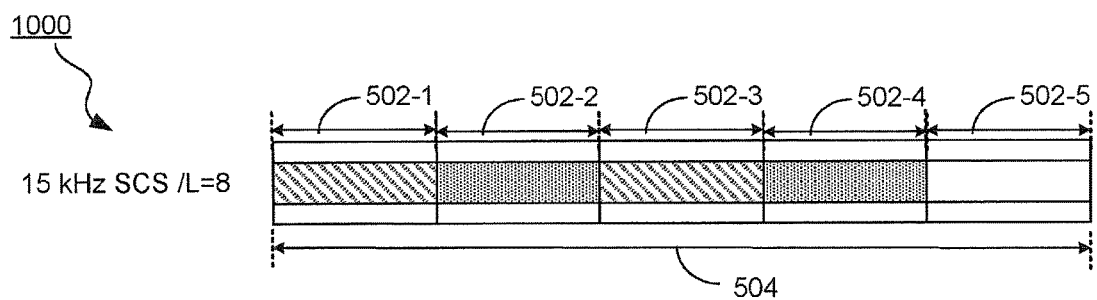
FIG. 10B illustrates a schematic of a half radio frame structure with 4 time slots in a subcarrier spacing of 15 kHz for SSB transmission in a half radio frame of 5 ms, in accordance with some embodiments of the present disclosure.

FIG. 10B illustrates a schematic of a half radio frame structure 1000 with 4 time slots 502 in a subcarrier spacing of 15 kHz for SSB transmission in a half radio frame 504 of 5 ms, in accordance with some embodiments of the present disclosure. In some embodiments, the subcarrier spacing (SCS) is 15 kHz and the maximum number of SSBs is 8. One time slot in the half radio frame of 5 ms can carry 2 SSBs and comprise 14 symbols. Since there are two SSBs in a time slot 502 and each of the two time slots occupies 1 ms, a maximum number of 4 time slots and 8 SSBs are required in a half-frame 504 of 5 ms. In the illustrated embodiment, first four times slots 502-1/502-2/502-3/502-4 each comprises 2 SSBs. It should be noted that the time slot with SSBs can occupy any 4 times slots in the half-frame 504 of 5 ms and each SSB can occupy any 4 continuous symbols in the time slot, as discussed above in FIGS. 3-7.

Figure 10C:
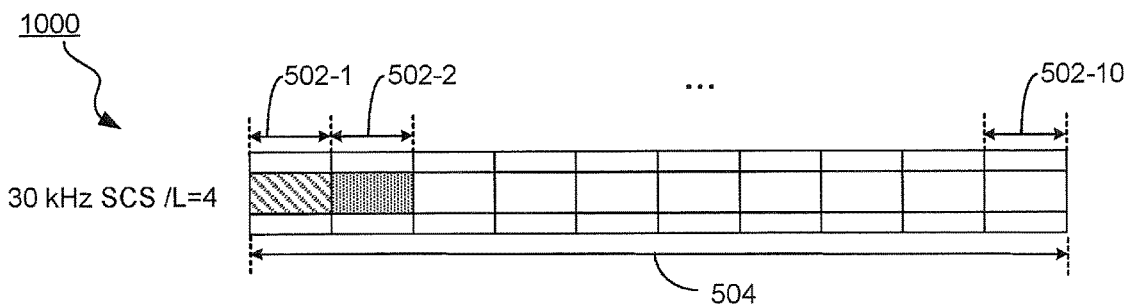
FIG. 10C illustrates a schematic of a half radio frame structure with 2 time slots in a subcarrier spacing of 30 kHz for SSB transmission in a half radio frame of 5 ms, in accordance with some embodiments of the present disclosure.

FIG. 10C illustrates a schematic of a half radio frame structure 1000 with 2 time slots 502 in a subcarrier spacing of 30 kHz for SSB transmission in a half radio frame 504 of 5 ms, in accordance with some embodiments of the present disclosure. In some embodiments, the subcarrier spacing (SCS) is 30 kHz and the maximum number of SSBs is 4. One time slot in the half radio frame of 5 ms can carry 2 SSBs and comprise 14 symbols. Since there are two SSBs in a time slot 502 and each of the 2 time slots occupies 0.5 ms, a maximum number of 2 time slots and 4 SSBs are required in a half-frame 504 of 5 ms. In the illustrated embodiment, first 2 times slots 502-1/502-2 each comprises 2 SSBs. It should be noted that the time slot with SSBs can occupy any 2 times slots in the half-frame 504 of 5 ms and each SSB can occupy any 4 continuous symbols in the time slot, as discussed above in FIGS. 3-7.

Figure 10D:
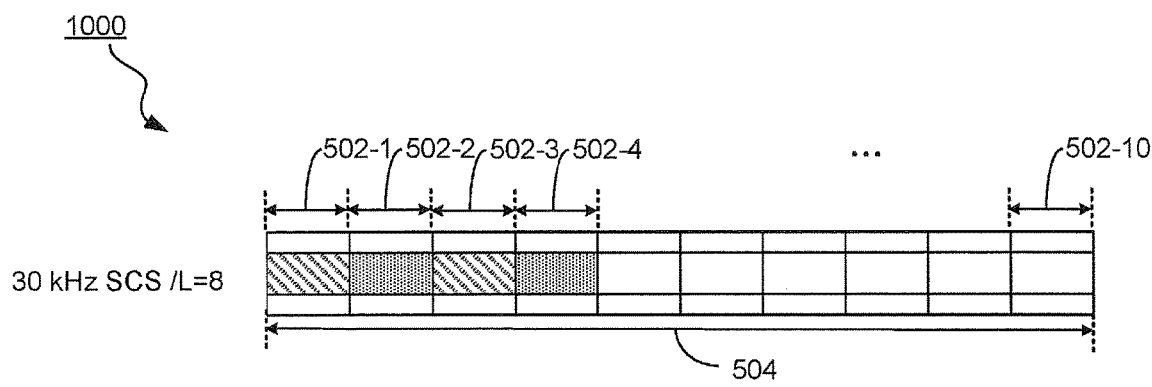
FIG. 10D illustrates a schematic of a half radio frame structure with 4 time slots in a subcarrier spacing of 30 kHz for SSB transmission in a half radio frame of 5 ms, in accordance with some embodiments of the present disclosure.

FIG. 10D illustrates a schematic of a half radio frame structure 1000 with 4 time slots 502 in a subcarrier spacing of 30 kHz for SSB transmission in a half radio frame 504 of 5 ms, in accordance with some embodiments of the present disclosure. In some embodiments, the subcarrier spacing (SCS) is 30 kHz and the maximum number of SSBs is 8. One time slot in the half radio frame of 5 ms can carry 2 SSBs and comprise 14 symbols. Since there are 2 SSBs in a time slot 502 and each of the 4 time slots occupies 0.5 ms, a maximum number of 4 time slots and 8 SSBs are required in a half-frame 504 of 5 ms. In the illustrated embodiment, first four time slots 502-1/502-2/502-3/502-4 each comprises 2 SSBs. It should be noted that the time slot 502 with SSBs can occupy any 4 times slots in the half-frame 504 of 5 ms and each SSB can occupy any 4 continuous symbols in the time slot, as discussed above in FIGS. 3-5 and 8.

Figure 10E:
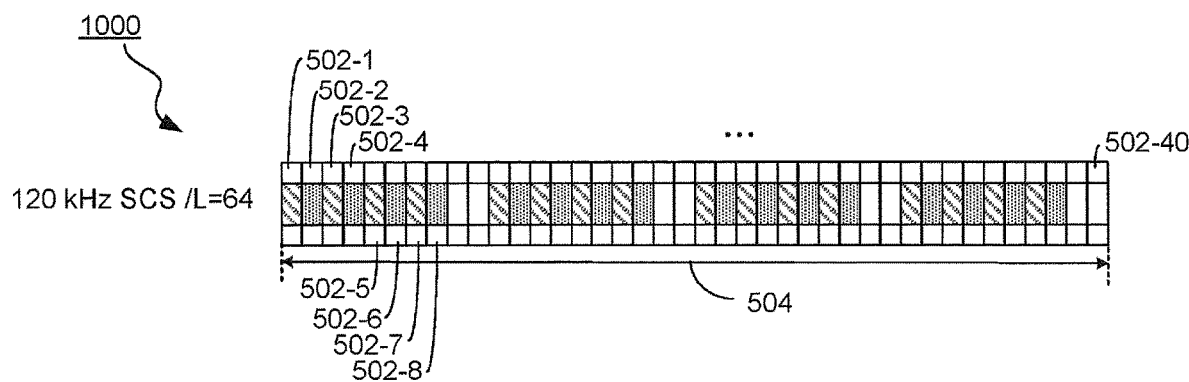
FIG. 10E illustrates a schematic of a half radio frame structure with 32 time slots in a subcarrier spacing of 120 kHz for SSB transmission in a half radio frame of 5 ms, in accordance with some embodiments of the present disclosure.

FIG. 10E illustrates a schematic of a radio frame structure 1000 with 32 time slots 502 in a subcarrier spacing of 120 kHz for SSB transmission in a half radio frame 504 of 5 ms, in accordance with some embodiments of the present disclosure. In some embodiments, the subcarrier spacing (SCS) is 120 kHz and the maximum number of SSBs is 64. One time slot in the half radio frame of 5 ms can carry 2 SSBs and comprise 14 symbols. Since there are 2 SSBs in a time slot 502 and each of the 64 time slots occupies 0.5 ms, a maximum number of 4 time slots and 8 SSBs are required in a half-frame 504 of 5 ms. In the illustrated embodiment, 32 time slots 502 in a subcarrier spacing of 120 kHz each comprises 2 SSBs. It should be noted that the time slot 502 with SSBs can occupy any 4 times slots in the half-frame 504 of 5 ms and each SSB can occupy any 4 continuous symbols in the time slot, as discussed above in FIGS. 3-5 and 8.

Figure 10F:
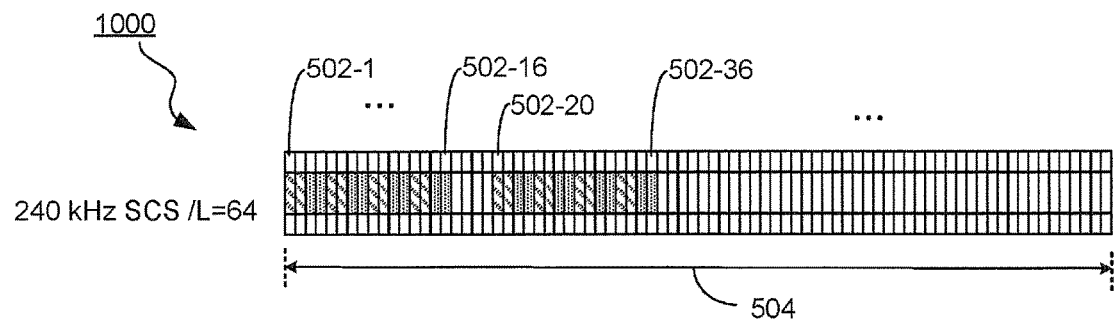
FIG. 10F illustrates a schematic of a half radio frame structure with 16 time slots in a subcarrier spacing of 120 kHz for SSB transmission in a half radio frame of 5 ms, in accordance with some embodiments of the present disclosure.

FIG. 10F illustrates a schematic of a half radio frame structure 1000 with 16 time slots 502 in a subcarrier spacing of 120 kHz for SSB transmission in a half radio frame 504 of 5 ms, in accordance with some embodiments of the present disclosure. In some embodiments, the subcarrier spacing (SCS) is 120 kHz and the maximum number of SSBs is 64. One time slot in a subcarrier spacing of 120 kHz in the half radio frame of 5 ms can carry 4 SSBs and comprise 28 symbols in a subcarrier spacing of 240 kHz. Since there are 4 SSBs in a time slot 502 with a subcarrier spacing of 120 kHz and each of the 16 time slots occupies 0.125 ms, a maximum number of 16 time slots and 64 SSBs are required in a half-frame 504 of 5 ms. It should be noted that the time slot 502 with SSBs can occupy any 4 times slots in the half-frame 504 and each SSB can occupy any 4 continuous symbols in the time slot, as discussed above in FIGS. 3-5 and 8. The time slot in a specific SCS comprises 14 consecutive OFDM symbols in the specific SCS.

In some embodiments, exemplary configurations of time slots in a half radio frame in FIGS. 10A-10F, illustrate all available time slots which can be potentially used for an IAB node 102 to transmit SSBs, i.e., for potential transmission of SSBs. It should be noted that the IAB node 102 can select any one or more time slots from these available ones in a half radio frame that can be actually used for the IAB node 102 to transmit SSBs, i.e., for actual transmission of SSBs. In some embodiments, time slots for actual transmission of SSBs is a subset of time slots for potential transmission of SSBs.

Figure 11:
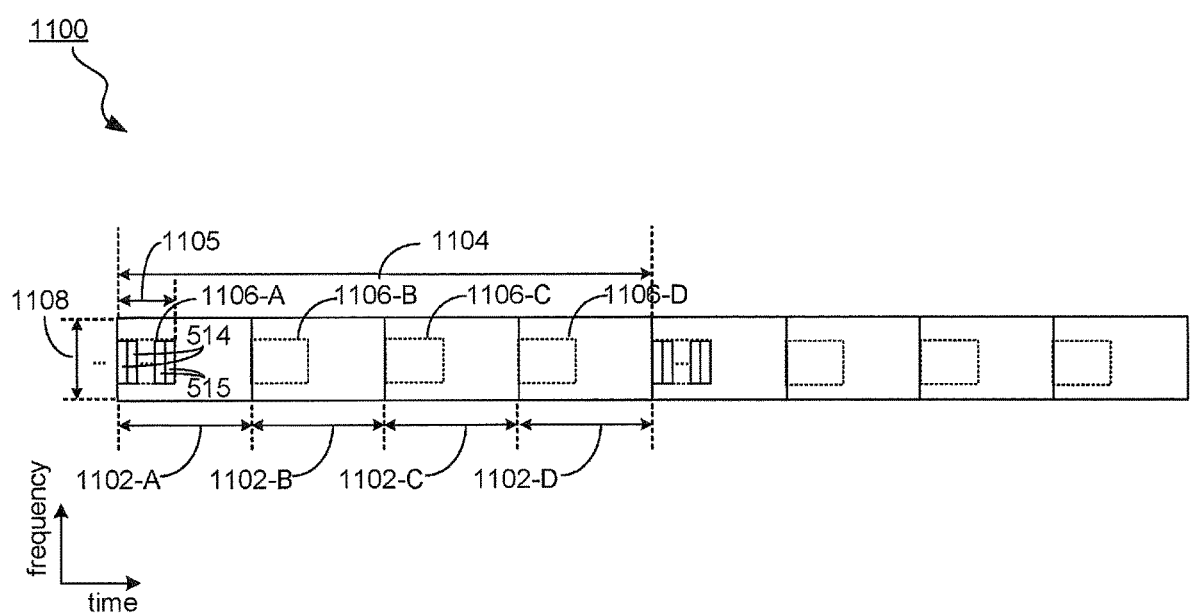
FIG. 11 illustrates a schematic of a half radio frame structure, in accordance with some embodiments of the present disclosure.

FIG. 11 illustrates a schematic of a radio frame structure 1100, in accordance with some embodiments of the present disclosure. In the illustrated embodiment, the SSB transmission periodicity has the same length as a time window 20 ms and a SSB burst set 1106-1A for SSB transmission occupies a first half radio frame 1102 with a periodicity 1104 of 20 ms for actual transmission of SSBs. In some embodiments, a SSB transmission periodicity of 20 ms is used for detecting and receiving a SSB on a UE 104 for carriers that support initial access. The SSB burst set 1106-A has a length 1105 of 2 ms and occupies a first 2 ms in the half radio frame 1102 which has a length of 5 ms. The SSB burst set 1106-A comprises a plurality of SSBs 514/515. Three other SSB burst sets 1106-B, 1106-C, and 1106-D in the periodicity 1104 are for potential transmission of SSBs. The radio frame structure 1100 occupies a system bandwidth and bandwidth part (BWP) 1108. In some embodiments, a BWP is a part of system bandwidth that can be used as the frequency range for data scheduling. It should be noted that the half radio frame 1102 can occupy any one of the 4 half radio frames in the periodicity 1104 for actual transmission of SSBs and the SSB burst set 1106 can occupy any symbols in the half radio frame 1102 as discussed in FIGS. 6-9 and are within the scope of this disclosure.

In some embodiments, a SSB transmission periodicity can be one of the following: 5, 10, 20, 40, 80, and 160 ms. In some embodiments, when the SSB transmission periodicity is 10 ms, two SSB burst sets 1106 in the half radio frame 1102 at odd (i.e., 1102-A and 1102-C) or even positions (1102-B and 1102-D) can be used for the actual transmission of SSBs. In some embodiments, when the SSB transmission periodicity is 5 ms, all the four SSB burst sets 1106 (i.e., 1106-A, 1106-B, 1106-C, and 1106-D) in the corresponding half radio frames 1102 (i.e., 1102-A, 1102-B, 1102-C, and 1102-D) are used for the actual transmission of SSBs.

Figure 12:
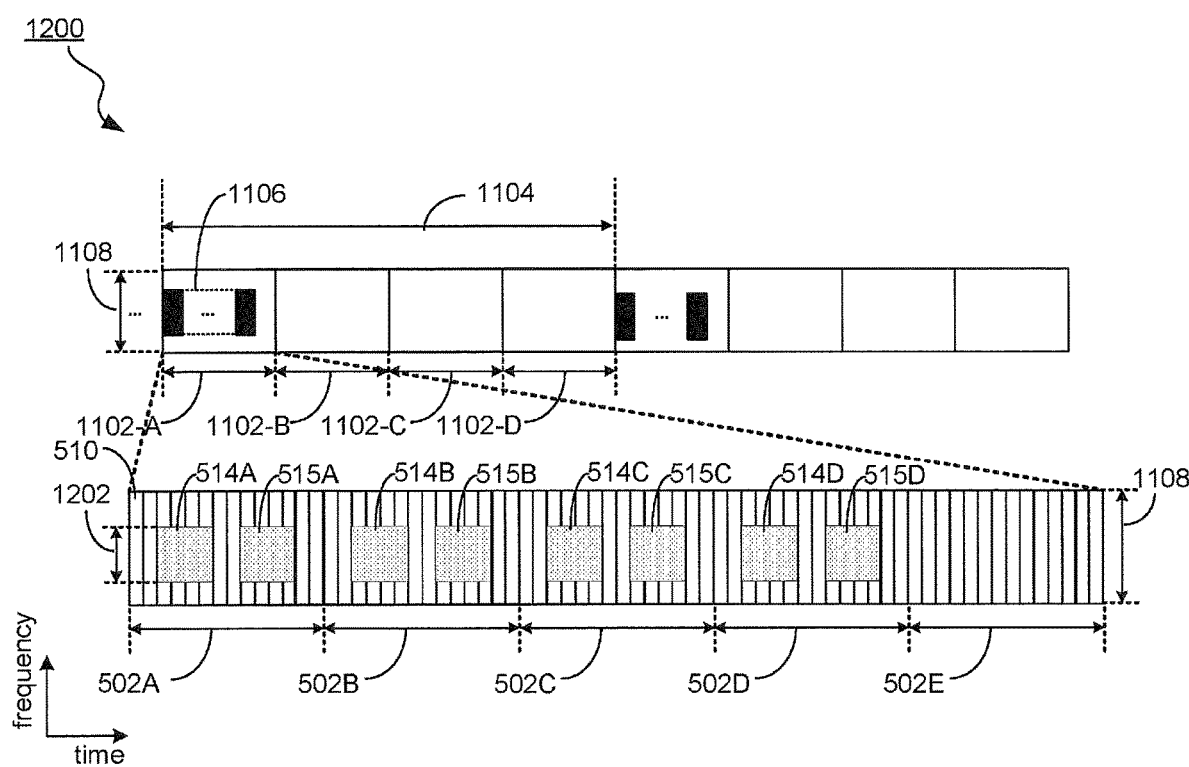
FIG. 12 illustrates a schematic of a half radio frame structure, in accordance with some embodiments of the present disclosure.

FIG. 12 illustrates a schematic of a half radio frame structure 1200, in accordance with some embodiments of the present disclosure. In the illustrated embodiments, a SSB transmission periodicity is 20 ms and occupies a first times lot 1102. Further, a SSB burst set 1106 comprises 5 time slots 502, i.e., 502A, 502B, 502C, 502D and 502E. Each of the time slots 502 occupies 1 BWP 1108 and 14 OFDM symbols 510. A first 4 times lots each comprises 2 SSBs 514/515 and each SSB occupies 4 OFDM symbols and a frequency range 1202, in which the frequency range 1202 is smaller than the BWP 1108. In the illustrated embodiment, the two SSBs 514/515 occupies the same OFDM symbols in the first four time slots 502. It should be noted that FIG. 1200 is an example and any configurations of the SSBs in the time slot and the SSB burst set in the half radio frame, as well as a different SSB transmission periodicity can be used and are within the scope of this disclosure.

In some embodiments, when a SSB burst set 1106 in a SSB transmission period is required to be muted so that a corresponding IAB node 102 can detect SSBs transmitted from other IAB nodes 102, resources occupied by all the eight SSBs 514/515 in a first half radio frame 1102 can be configured as muting resources in the SSB transmission period. Specifically, in the illustrated embodiment, the muting resources are SSBs 514A and 515A of the first time slot 502A, 514B and 515B of the second time slot 502B, 514C and 515C of the third time slot 502C, and 514D and 515D of the fourth time slot 502D, occupying 32 OFDM symbols 510 and a frequency range 1202 of 20 PRB's.

In some embodiments, when a SSB burst set 1106 in a SSB transmission period is required to be muted so that a corresponding IAB node 102, can detect SSBs transmitted from adjacent IAB nodes 102, resources for the actual transmission of SSBs in a half radio frame 1102 can be configured as muting resource in the SSB transmission period. Although there are eight total SSB blocks one SSB transmission period, 3 SSBs are not selected by the IAB node 102 for actual transmission of SSBs and these SSBs are not used as muting resources. Specifically, in the illustrated embodiment, the muting resources are SSBs 514A of the first time slot 502A, 514B of the second time slot 502B, 514C of the third time slot 502C, and 514D and 515D of the fourth time slot 502D, occupying 20 OFDM symbols 510 and a frequency range 1202 of 20 PRBs.

Figure 13:
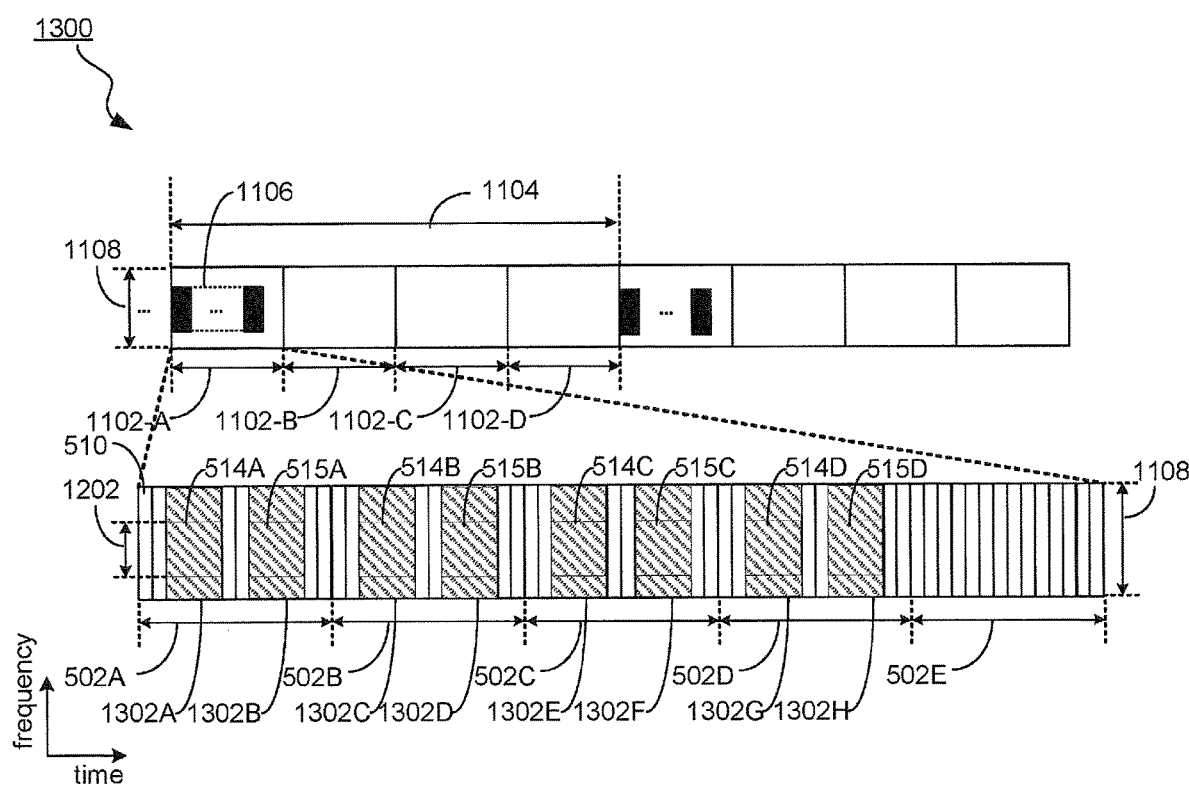
FIG. 13 illustrates a schematic of a half radio frame structure, in accordance with some embodiments of the present disclosure.

FIG. 13 illustrates a schematic of a half radio frame structure 1300 in accordance with some embodiments of the present disclosure. In the illustrated embodiments, a SSB transmission periodicity 1104 is 20 ms and occupies a first half radio frame 1102. Further, a SSB burst set 1106 comprises 5 time slots 502, i.e., 502A, 502B, 502C, 502D and 502E. Each of the time slots 502 occupies 1 BWP 1108 and 14 OFDM symbols 510. A first 4 times lots each comprises 2 SSBs 514/515 and each SSB occupies 4 OFDM symbols and a frequency range 1202, in which the frequency range 1202 is smaller than the BWP 1108. Further, in the illustrated embodiment, the two SSBs 514/515 occupies the same OFDM symbols in the first four time slots 502. It should be noted that FIG. 1200 is an example and any configurations of the SSBs in the time slot and the SSB burst set in the half radio frame, as well as a different SSB transmission periodicity can be used and are within the scope of this disclosure.

In some embodiments, when a SSB burst set 1106 in a SSB transmission period 1104 is required to be muted so that a corresponding IAB node 102 can detect SSB transmitted from other IAB nodes 102, resources with a frequency range of an BWP 1108 and on OFDM symbols 510 occupied by all the eight SSBs 514/515 in a half radio frame 1102 can be configured as muting resources in the SSB transmission period. Specifically, in the illustrated embodiment, the SSBs 514A and 515A of the first time slot 502A, 514B and 515B of the second time slot 502B, 514C and 515C of the third time slot 502C, and 514D and 515D of the fourth time slot 502D each occupies 4 OFDM symbols 510 (i.e., 2, 3, 4, 5, 8, 9, 10, and 11 symbols) and a frequency range 1202 of 20 PRBs. The muting resources 1302 (i.e., 1302A, 1302B, 1302C, 1302D, 1302E, 1302F, 1302G, and 1302H) occupy all the resources in the frequency domain (i.e., system bandwidth or BWP 1108) on 32 OFDM symbols corresponding to all of the eight SSBs 514/515.

In some embodiments, when a SSB burst set 1106 in a SSB transmission period 1104 is required to be muted so that a corresponding IAB node 102 can detect SSBs transmitted from other IAB nodes 102, resources with a frequency range of an BWP 1108 and on OFDM symbols 510 occupied by SSBs 514/515 for actual transmission of SSBs in a half radio frame 1102 can be configured as muting resources in the SSB transmission period. Specifically, in the illustrated embodiment, SSBs 514A of the first time slot 502A, 514B of the second time slot 502B, 514C of the third time slot 502C, and 514D and 515D of the fourth time slot 502D each is used for the actual transmission of SSBs and occupies 4 OFDM symbols 510 in a time slot (i.e., 2, 3, 4, 5, 8, 9, 10, and 11 symbols) and a frequency range 1202 of 20 PRBs. The muting resources 1302 (i.e., 1302A, 1302C, 1302E, 1302G, and 1302H) occupy all the resources in the frequency domain (i.e., system bandwidth and BWP) on 20 OFDM symbols corresponding to the SSBs are SSBs 514A of the first time slot 502A, 514B of the second time slot 502B, 514C of the third time slot 502C, and 514D and 515D of the fourth time slot 502D.

In some embodiments, when a SSB burst set 1106 in a SSB transmission period 1104 is required to be muted so that a corresponding IAB node 102 can detect SSBs transmitted from other IAB nodes 102, resources in all of the 4 time slots 502 with potential transmission of SSBs 514/515 can be configured as muting resources. Specifically, all the resources occupying all the OFDM symbols 510 in all of the 4 time slots 502 in the time domain (i.e., 56 OFDM symbols) and in a frequency range of the SSB 1202 in the frequency domain are configured as muting resources. These resources comprise all the resources for the SSB transmission and for data transmission. In some embodiments, the muting resources comprises continuous resources in the time domain. In some embodiments, the muting resources are resources in all the 4 times slots 502 occupying 56 OFDM symbols 510 in the time domain and a frequency range 1108 covering all the PRB's in the system bandwidth or BWP 1108.

In some embodiments, when a SSB burst set 1106 in a SSB transmission period 1104 is required to be muted so that a corresponding IAB node 102 can detect SSBs transmitted from other IAB nodes 102, resources in time slot 502 with resources for actual transmission of SSBs 514/515 can be configured as muting resources. Specifically, in the illustrated embodiment, SSBs 514A of the first time slot 502A, 514B of the second time slot 502B, and 514C of the third time slot 502C each is used for the actual transmission of SSBs and occupies 4 OFDM symbols 510 in a time slot and a frequency range 1202 of 20 PRBs. The muting resources are resources in the time slots 502A, 502B and 502C occupying 42 OFDM symbols 510 in the time domain and a frequency range 1202 of 20 PRB's in the frequency domain. In some other embodiments, the muting resources are resources in the time slots 502A, 502B and 502C occupying 42 OFDM symbols 510 in the time domain and a frequency range 1108 covering all the PRB's in the system bandwidth or BWP 1108.

In some embodiments, when a SSB burst set 1106 in a SSB transmission period is required to be muted so that a corresponding IAB node 102 can detect SSBs transmitted from other IAB nodes 102, resources in the entire half radio frame 1102 with a period for potential transmission of SSBs 514/515 can be configured as muting resources. In some embodiments, the muting resources are resources in the half radio frame 1102 occupying 5 time slots 502 (i.e., 60 OFDM symbols) and a frequency range 1202 of 20 RB. In some other embodiments, the muting resources are resources in the half radio frame 1102 occupying 5 times lots 502 (i.e., 60 OFDM symbols) and a frequency range 1108 covering all the PRB's in the system bandwidth or BWP 1108.

Figure 14:
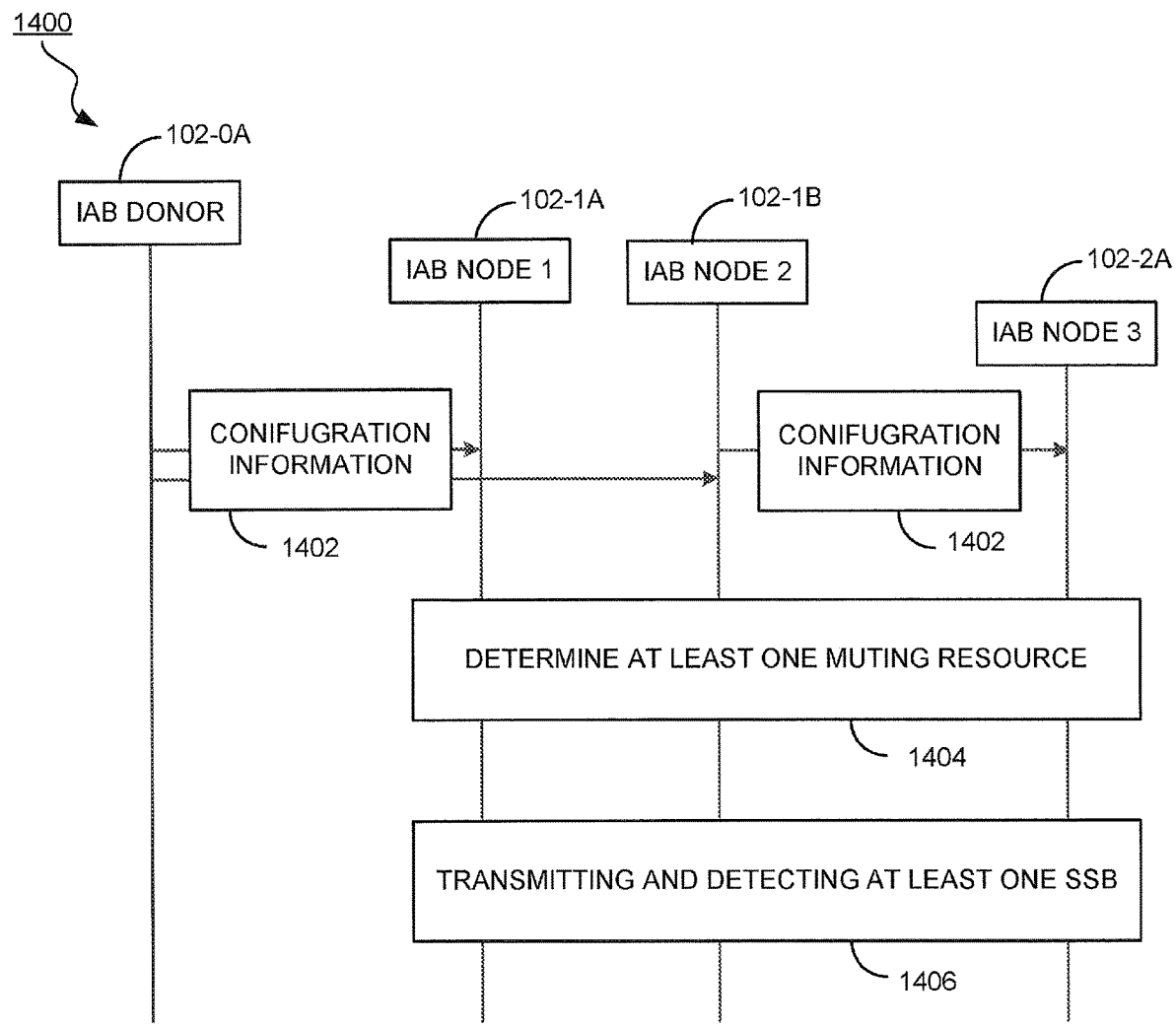
FIG. 14 illustrates a method to perform a muting period configuration for IAB nodes in a communication system, in accordance with some embodiments of the present disclosure.

FIG. 14 illustrates a method 1400 to perform a muting period configuration for IAB nodes in a communication system, in accordance with some embodiments of the present disclosure. It is understood that additional operations may be provided before, during, and after the method 1400 of FIG. 14, and that some operations may be omitted or reordered. The communication system comprises 1 IAB donor 102-0A, 2 first-level IAB nodes 102-1A and 102-1B and 1 second-level IAB node 102-2A. It should be noted that FIG. 14 is an example and a communication system comprising any number of IAB nodes are within the scope of this disclosure.

The method 1400 starts with operation 1402 in which a muting resource configuration information is transmitted from an upper-level IAB node (can also be called as parent IAB node) to a lower-level IAB node (can also be called as son IAB node). Specifically, a first first-level IAB node (102-1A) and a second first-level IAB node (102-1B) obtain the muting configuration information from the IAB donor 102-0A. The second-level IAB node 102-2A obtains the muting configuration information from the corresponding second first-level IAB node 102-1B.

In some embodiments, the muting resources configuration information can be transmitted from an upper-level IAB node to a lower-level IAB node through one of the following: an existing system information block (e.g., SIB1 or SIB2), an IAB-related SIB (i.e., SIBn), and UE-specified radio resource control (RRC) signaling. In some embodiments, muting resources comprise resources in a SSB burst set. In some embodiments, the muting resource configuration information can be transmitted from the upper-level IAB node to the lower-level IAB node on a combination of system information and a RRC signaling.

In some embodiments, the muting resource configuration information comprises a muting periodicity, a muting pattern table index and a muting pattern index. In some embodiments, the muting periodicity is pre-defined by the system. In some embodiments, the value of the muting periodicity can be indicated from the upper-level IAB node to the lower-level IAB node using a bit field. For example, if there are 4 values of the muting periodicity (i.e., set of muting periodicity values), including 40, 80, 160 and 320 ms, 2-bit index can be used to indicate these values. Specifically, 00 represents a muting periodicity of 40 ms; 01 represents a muting periodicity of 80 ms; 10 represents a muting periodicity of 160 ms; and 11 represents a muting periodicity of 320 ms. In some embodiments, the muting periodicity is a fixed value and pre-configured to all the IAB nodes and in this case, the muting resource configuration information does not comprise a muting periodicity.

Figure 15:
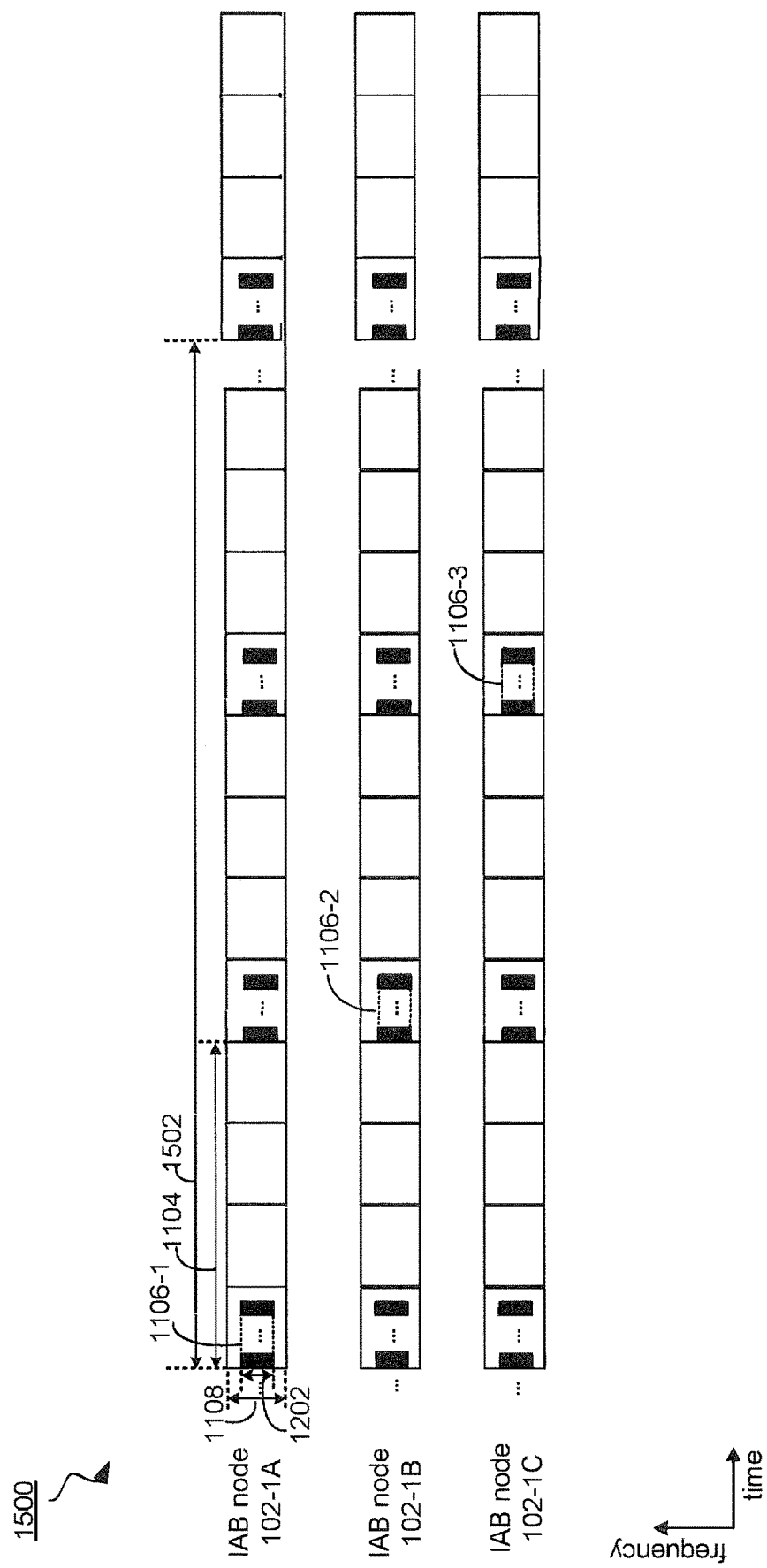
FIG. 15 illustrates radio frame structure for 3 IAB nodes with a muting periodicity of 160 ms, in accordance with some embodiments of the present disclosure.

FIG. 15 illustrates radio frame structure 1500 for 3 IAB nodes 102 with a muting periodicity 1502 of 160 ms, in accordance with some embodiments of the present disclosure. In some embodiments, the muting periodicity 1502 is pre-defined by the system. The first symbol of each of the muting periodicity 1502 is defined as the starting edge of a radio frame, which satisfies SFN mod 16=0. In some embodiments, a muting periodicity 1502 occupies 16 radio frames. In the illustrated embodiment, the SSB transmission periodicity is 20 ms and there are 8 potential muting resources in 1 muting periodicity 1502. It should be noted that the SSB transmission periodicity 1104 and the muting periodicity 1502 can be other values, which may result in a different number of muting resources in 1 muting periodicity 1502 and are within the scope of the present disclosure.

In the illustrated embodiment of FIG. 15, there are three first-level IAB nodes, including a first first-level IAB node 102-1A, a second first-level IAB node 102-1B, and a third first-level IAB node 102-1C. Each of the 3 IAB nodes has a muting periodicity of 120 ms and a SSB transmission periodicity of 20 ms. Specifically, the first first-level IAB node 102-1A mutes on the muting resources 1106-1 in a first SSB transmission period; the second first-level IAB node 102-1B mutes on the muting resources 1106-2 in a second SSB transmission period; and the third first-level IAB node 102-1C mutes on the muting resources 1106-3 in a third SSB transmission period.

Referring back to FIG. 14, the muting pattern table is pre-defined by the system and a 2-bit bit field can be used and transmitted to the lower-level IAB nodes for the indication of the muting pattern table index. For example, a muting pattern table index value of 00 corresponds to a muting pattern table 1; a muting pattern table index value of 01 corresponds to a muting pattern table 2; a muting pattern table index value of 10 corresponds to a muting pattern table 3; and a muting pattern table index value of 11 corresponds to a muting pattern table 4.

FIGS. 16A-16D illustrate exemplary muting pattern tables 1600 with exemplary muting patterns, in accordance with some embodiments of the present disclosure. Each of the 4 muting pattern tables 1600 comprises 8 different muting patterns 1604 and each of the 8 muting patterns in the tables are indexed with a muting pattern index 1602, i.e., 0-7. Further, each of the 8 muting patterns comprises 8 SSB transmission resources, i.e., resources 0-7 for potential transmission of SSBs.

In the muting pattern table 1600 of FIG. 16A, each of the 8 muting patterns comprises 1 muting resource and 7 regular SSB transmission resources. Specifically, at a muting pattern index of 0 in the muting pattern table 1600, a SSB transmission resource 0 is a muting resource and the rest of the SSB transmission resources (i.e., 1-7) are for actual transmission of SSBs; at a muting pattern index of 1 in the muting pattern table 1600, a SSB transmission resource 1 is a muting resource and the rest of the SSB transmission resources (i.e., 0, and 2-7) are for actual transmission of SSBs; at a muting pattern index of 2 in the muting pattern table 1600, a SSB transmission resource 2 is a muting resource and the rest of the SSB transmission resources (i.e., 0, 1, and 3-7) are for actual transmission of SSBs; at a muting pattern index of 3 in the muting pattern table 1600, a SSB transmission resource 3 is a muting resource and the rest of the SSB transmission resources (i.e., 0-2, and 4-7) are for actual transmission of SSBs; at a muting pattern index of 4 in the 1600, a SSB transmission resource 4 is a muting resource and the rest of the SSB transmission resources (i.e., 0-3, and 5-7) are for actual transmission of SSBs; at a muting pattern index of 5 in the muting pattern table 1600, a SSB transmission resource 5 is a muting resource and the rest of the SSB transmission resources (i.e., 0-4, 6, and 7) are for actual transmission of SSBs; at a muting pattern index of 6 in the muting pattern table 1600, a SSB transmission resource 6 is a muting resource and the rest of the SSB transmission resources (i.e., 0-5, and 7) are for actual transmission of SSBs; and at a muting pattern index of 7 in the muting pattern table 1600, a SSB transmission resource 7 is a muting resource and the rest of the SSB transmission resources (i.e., 1-6) are for actual transmission of SSBs.

In the muting pattern table 1610 of FIG. 16B, each of the 8 muting patterns comprises 7 muting resources and 1 resource for actual transmission of SSBs. Specifically, at a muting pattern index of 0 in the muting pattern table 1600, a SSB transmission resource 0 is a resource for actual transmission of SSBs and the rest are muting resources (i.e., 1-7); at a muting pattern index of 1 in the muting pattern table 1600, a SSB transmission resource 1 is a resource for actual transmission of SSBs and the rest are muting resources (i.e., 0, and 2-7); at a muting pattern index of 2 in the muting pattern table 1600, a SSB transmission resource 2 is a resource for actual transmission of SSBs and the rest are muting resources (i.e., 0, 1, and 3-7); at a muting pattern index of 3 in the muting pattern table 1600, a SSB transmission resource 3 is a resource for actual transmission of SSBs and the rest are muting resources (i.e., 0-2, and 4-7); at a muting pattern index of 4 in the muting pattern table 1600, a SSB transmission resource 4 is a resource for actual transmission of SSBs and the rest are muting resources (i.e., 0-3, and 5-7); at a muting pattern index of 5 in the muting pattern table 1600, a SSB transmission resource 5 is a resource actual transmission of SSBs and the rest are muting resources (i.e., 0-4, 6, and 7); at a muting pattern index of 6 in the muting pattern table 1600, a SSB transmission resource 6 is a resource for actual transmission of SSBs and the rest are muting resources (i.e., 0-5, and 7); and at a muting pattern index of 7 in the muting pattern table 1600, a SSB transmission resource 7 is a resource for actual transmission of SSBs and the rest are muting resources (i.e., 1-6).

In the muting pattern table 1620 of FIG. 16C, each of the 8 muting patterns comprises 4 muting resource and 3 resources for actual transmission of SSBs. Specifically, at a muting pattern index of 0 in the muting pattern table 1600, SSB transmission resources 1, 3, 5, and 7 are muting resources and SSB transmission resources 0, 2, 4, and 6 are for actual transmission of SSBs; at a muting pattern index of 1 in the muting pattern table 1600, SSB transmission resources 0, 2, 4 and 6 are muting resources and SSB transmission resources 1, 3, 5, and 7 are for actual transmission of SSBs; at a muting pattern index of 2 in the muting pattern table 1600, SSB transmission resources 2, 3, 6, and 7 are muting resources and SSB transmission resources 0, 1, 4, and 5 for actual transmission of SSBs; at a muting pattern index of 3 in the muting pattern table 1600, SSB transmission resources 0, 1, 4, and 5 are muting resources and SSB transmission resources 2, 3, 6, and 7 are for actual transmission of SSBs; at a muting pattern index of 4 in the muting pattern table 1600, SSB transmission resources 2, 3, 4, and 5 are muting resources and SSB transmission resources 0, 1, 6, and 7 are actual transmission of SSBs; at a muting pattern index of 5 in the muting pattern table 1600, SSB transmission resources 0, 1, 6, and 7 are muting resources and SSB transmission resources 2, 3, 4, and 5 are for actual transmission of SSBs; at a muting pattern index of 6 in the muting pattern table 1600, SSB transmission resources 4, 5, 6, and 7 are muting resources and SSB transmission resources 0, 1, 2, and 3 are for actual transmission of SSBs; and at a muting pattern index of 7 in the muting pattern table 1600, SSB transmission resources 0, 1, 2, and 3 are muting resources and SSB transmission resources 4, 5, 6, and 7 are actual transmission of SSBs.

In the muting pattern table 1630 of FIG. 16D, each of the 8 muting patterns comprises 2 muting resource and 6 resources for actual transmission of SSBs. Specifically, at a muting pattern index of 0 in the muting pattern table 1600, SSB transmission resources 6 and 7 are muting resources and SSB transmission resources 0-5 are for actual transmission of SSBs; at a muting pattern index of 1 in the muting pattern table 1600, SSB transmission resources 0 and 1 are muting resources and SSB transmission resources 2-7 are for actual transmission of SSBs; at a muting pattern index of 2 in the muting pattern table 1600, SSB transmission resources 2, and 3 are muting resources and SSB transmission resources 0, 1, and 4-7 for actual transmission of SSBs; at a muting pattern index of 3 in the muting pattern table 1600, SSB transmission resources 4 and 5 are muting resources and SSB transmission resources 0-3, 6, and 7 are for actual transmission of SSBs; at a muting pattern index of 4 in the muting pattern table 1600, SSB transmission resources 5 and 7 are muting resources and SSB transmission resources 0-4, and 6 are for actual transmission of SSBs; at a muting pattern index of 5 in the muting pattern table 1600, SSB transmission resources 4 and 6 are muting resources and SSB transmission resources 0-3, 5 and 7 are for actual transmission of SSBs; at a muting pattern index of 6 in the muting pattern table 1600, SSB transmission resources 1 and 3 are muting resources and SSB transmission resources 0, 2, and 4-7 are for actual transmission of SSBs; and at a muting pattern index of 7 in the muting pattern table 1600, SSB transmission resources 0 and 2 are muting resources and SSB transmission resources 1, and 3-7 are for actual transmission of SSBs.

FIGS. 16A-16D are exemplary muting pattern tables with exemplary muting patterns and it should be noted any numbers of muting pattern tables comprising any number of muting patterns and different muting patterns are within the scope of this disclosure. Different muting pattern tables comprise different numbers of muting resource in a muting periodicity. In some embodiments, there is only 1 muting pattern table. In some embodiments, the number of muting resources in a muting periodicity of an IAB node may affect opportunities for being detected by adjacent IAB nodes and also may affect the opportunities to successfully detect the adjacent IAB nodes. For example, referring to FIGS. 15 and 16, when there are 7 muting resources in a muting periodicity for an IAB node 102-1A, the opportunity for this IAB node 102-1A to be detected by IAB nodes 102-1B/102-1C is thus low. For another example, when there are 7 resources in a muting periodicity for actual transmission of SSBs and only 1 muting resources for the IAB node 102-1A, the IAB node 102-1A detects SSBs from IAB nodes 102-1B/102-1C on the same muting resource, which degrades the measurement performance of the IAB node 102-1A on the muting resource. In some embodiments, the number of muting resources in a muting periodicity is determined by an upper-level IAB node according to the status of the wireless communication network, and a muting table can be determined and configured to the lower-level IAB nodes.

In some embodiments, in order to indicate a muting pattern in a muting pattern table, a bit field can be used for muting pattern index indication. Referring to FIG. 16 in which each muting pattern table comprises 8 muting patterns, a 3-bit bit field can be used to indicate muting pattern index. In some embodiments, different IAB nodes may receive different 3-bit bit fields corresponding to different muting patterns. In some embodiments, muting patterns in a muting pattern table is pre-defined by the system and transmitted from an upper-level IAB node to a lower-level IAB node in the muting resource configuration information.

In some embodiments, the muting pattern index in the muting pattern table can be determined by an upper-level IAB node, i.e., a parent IAB node. according to a cell identifications (ID) of a lower-level IAB node. For example, the muting pattern index can be determined using (a cell ID of the lower-level IAB node) mod (a number of resources for potential transmission of SSBs in a muting periodicity). Referring to FIG. 15, there are 8 resources for potential transmission of SSBs in a muting periodicity of 160 ms. Specifically, when the cell ID of lower-level IAB node is 001010111 in binary which corresponds to 87 in decimal, the muting pattern index of the lower-level IAB node is equal to 7 (i.e., 87 mod 8). The muting pattern index of 7 can be then used together with the muting table to locate the muting resources.

For another example, the upper-level IAB node can determine staggered resources for all the lower-level IAB nodes using cell ID mod 4. IAB nodes with in the same group comprise the values on the 2 least-significant bits (LSB). Further, the muting pattern index can be determined using a similar method discussed above. Specifically, the muting pattern index for the lower-level IAB node can be determined by the 8 most-significant bits (MSB) of the cell ID of the corresponding lower-level IAB node (e.g., 01010111 in binary and 87 in decimal) and its number of resources for potential transmission of SSBs in a muting periodicity, e.g., 87 mod 8 which equals 7. The muting pattern index of the IAB node with a cell ID of 01010111 is 7. An overhead for the indication of muting pattern index according to the cell ID, can be comparably lower than that using an explicit indication, for example using a bit field.

In some embodiments, the upper-level IAB node can determine a set of 8 random numbers and each random number in the set is between 0 and 7 based on the cell ID of the lower-level IAB node as an initialization parameter. For example, the upper-level IAB node generates 8 random numbers (e.g., 37153406) for the lower-level node. In a first muting periodicity, the SSB transmission resource 3 is a muting resource and the rest of SSB transmission resources (i.e., 0-2, and 4-7) are resources for actual transmission of SSBs; in a second muting periodicity, the SSB transmission resource 7 is a muting resource and the rest of SSB transmission resources (i.e., 0-6) are resources for actual transmission of SSBs; in a third muting periodicity, the SSB transmission resource 1 is a muting resource and the rest of SSB transmission resources (i.e., 0, and 2-7) are resources for actual transmission of SSBs; in a fourth muting periodicity, the SSB transmission resource 5 is a muting resource and the rest of SSB transmission resources (i.e., 0-4 and 6-7) are resources for actual transmission of SSBs; in a fifth muting periodicity, the SSB transmission resource 3 is a muting resource and the rest of SSB transmission resources (i.e., 0-2 and 4-7) are resources for actual transmission of SSBs; in a sixth muting periodicity, the SSB transmission resource 4 is a muting resource and the rest of SSB transmission resources (i.e., 0-3, and 5-7) are resources for actual transmission of SSBs; in a seventh muting periodicity, the SSB transmission resource 0 is a muting resource and the rest of SSB transmission resources (i.e., 1-7) are resources for actual transmission of SSBs; and in an eighth muting periodicity, the SSB transmission resource 6 is a muting resource and the rest of SSB transmission resources (i.e., 0-5 and 7) are resources for actual transmission of SSBs. In some embodiments, the set of random numbers can be reused after a number of muting periodicity. For example, after 8 muting periodicities, in a ninth muting periodicity, the muting resource configuration is the same as the one used in the first muting periodicity and the rest of the muting periodicities can be done in the same manner. In some other embodiments, after 8 muting periodicity, a different set of random number can be generated by the upper-level IAB node for the lower-level IAB node which can be used in the following muting periodicities.

In some embodiments, the muting resource configuration information comprises a muting periodicity and a muting pattern. In some embodiments, the muting periodicity is pre-defined by the system. In some embodiments, the value of the muting periodicity can be indicated from the upper-level IAB node to the lower-level IAB node using a bit field. For example, if there are 4 values of the muting periodicity, including 40, 80, 160 and 320 ms, 4 2-bit index can be used to indicate these values. Specifically, 00 represents a muting periodicity of 40 ms; 01 represents a muting periodicity of 80 ms; 10 represents a muting periodicity of 160 ms; and 11 represents a muting periodicity of 320 ms. In some embodiments, the muting periodicity is a fixed value and pre-configured to all the IAB nodes and in this case, the muting resource configuration information does not comprise a muting periodicity.

In some embodiment, the muting pattern in the muting resource configuration information transmitted from a higher-level IAB node to a lower-level IAB node can be indicated by a bitmap. For example, referring back to FIG. 15 again, in which a muting periodicity comprises 8 resources for potential transmission of SSBs, an 8-bit bitmap can be used by an upper-level IAB node for the indication of at least one muting resource to a lower-level IAB node. Specifically, a 8-bit bitmap comprising "11011111", indicating a SSB transmission resource 2 is a muting resource and the rest of the SSB transmission resources (i.e., 0, 1, and 3-7) are for actual transmission of SSBs. In some embodiments, the bitmap for muting pattern indication can be transmitted on a RRC signaling from the upper-level IAB node to the lower-level IAB node.

In some embodiments, different SSB transmission periodicity can be used on different IAB nodes. For example, the SSB transmission periodicity of IAB node 1 is 20 ms and the SSB transmission periodicity of IAB node 2 is 10 ms. Under the same muting periodicity of 160 ms, there are 8 and 16 resources for potential transmission of SSBs for IAB node 1 and IAB node 2, respectively. Therefore, different bitmaps (i.e., 8-bit and 16-bit bitmaps) can be used for IAB node 1 and IAB node 2, respectively.

In some embodiments, a plurality of IAB nodes with different SSB transmission periodicities can share the same muting pattern table, which can be pre-defined by the upper-level IAB node. The upper-level IAB nodes determines a muting pattern table according to the largest SSB transmission periodicity in the different SSB transmission periodicities from the plurality of IAB nodes. For example, the SSB transmission periodicity of IAB node 1 is 20 ms and the SSB transmission periodicity of IAB node 2 is 10 ms. An upper-level IAB node selects 1 muting pattern table (e.g., table 1600 of FIG. 16A) with 8 resources for potential transmission of SSBs for both of the IAB node 1 and IAB node 2. IAB node 1 with 8 resources for potential transmission of SSBs can obtain its muting resources according to the table as discussed in various embodiments of the present disclosure.

On the other hand, IAB node 2 with 16 resources for potential transmission of SSBs can obtain its muting resources using the same table. For example, at a muting pattern index 0 of table 1600, SSB transmission resource 0 and 1 of IAB node 2 are muting resources, the rest of the SSB transmission resources (i.e., 2-15) are resources for actual transmission of SSBs; at a muting pattern index 1 of table 1600, SSB transmission resource 2 and 3 of IAB node 2 are muting resources, the rest of the SSB transmission resources (i.e., 0-1, and 4-15) are resources for actual transmission of SSBs; at a muting pattern index 0 of table 1600, SSB transmission resource 4 and 5 of IAB node 2 are muting resources, the rest of the SSB transmission resources (i.e., 0-3, and 6-15) are resources for actual transmission of SSBs; at a muting pattern index 3 of table 1600, SSB transmission resource 6 and 7 of IAB node 2 are muting resources, the rest of the SSB transmission resources (i.e., 0-5 and 8-15) are resources for actual transmission of SSBs; at a muting pattern index 4 of table 1600, SSB transmission resource 8 and 9 of IAB node 2 are muting resources, the rest of the SSB transmission resources (i.e., 0-7 and 10-15) are resources for actual transmission of SSBs; at a muting pattern index 5 of table 1600, SSB transmission resource 10 and 11 of IAB node 2 are muting resources, the rest of the SSB transmission resources (i.e., 0-9 and 12-15) are resources for actual transmission of SSBs; at a muting pattern index 6 of table 1600, SSB transmission resource 12 and 13 of IAB node 2 are muting resources, the rest of the SSB transmission resources (i.e., 0-11, and 14-15) are resources for actual transmission of SSBs; and at a muting pattern index 7 of table 1600, SSB transmission resource 14 and 15 of IAB node 2 are muting resources, the rest of the SSB transmission resources (i.e., 0-13) are resources for actual transmission of SSBs.

For another example, SSB transmission resources in the muting pattern table (e.g., table 1600 of FIG. 16A) is for indication of muting resources at even or odd SSB transmission resources and the rest of SSB transmission resources are all used as resources for actual transmission of SSBs. Specifically, at a muting pattern index 0, SSB transmission resource 0 of IAB node 2 is a muting resource and the rest of the SSB transmission resources (i.e., 1-15) of IAB node 2 are resources for actual transmission of SSBs; at a muting pattern index 1, SSB transmission resource 3 of IAB node 2 is a muting resource and the rest of the SSB transmission resources (i.e., 1-2 and 4-15) of IAB node 2 are resources for actual transmission of SSBs; at a muting pattern index 2, SSB transmission resource 5 of IAB node 2 is a muting resource and the rest of the SSB transmission resources (i.e., 1-4 and 6-15) of IAB node 2 are resources for actual transmission of SSBs; at a muting pattern index 3, SSB transmission resource 7 of IAB node 2 is a muting resource and the rest of the SSB transmission resources (i.e., 1-6 and 8-15) of IAB node 2 are resources for actual transmission of SSBs; at a muting pattern index 4, SSB transmission resource 9 of IAB node 2 is a muting resource and the rest of the SSB transmission resources (i.e., 1-8 and 10-15) of IAB node 2 are resources for actual transmission of SSBs; at a muting pattern index 5, SSB transmission resource 11 of IAB node 2 is a muting resource and the rest of the SSB transmission resources (i.e., 1-10, and 12-15) of IAB node 2 are resources for actual transmission of SSBs; at a muting pattern index 6, SSB transmission resource 13 of IAB node 2 is a muting resource and the rest of the SSB transmission resources (i.e., 1-12 and 14-15) of IAB node 2 are resources for actual transmission of SSBs; and at a muting pattern index 7, SSB transmission resource 15 of IAB node 2 is a muting resource and the rest of the SSB transmission resources (i.e., 1-14) of IAB node 2 are resources for actual transmission of SSBs.

In some embodiments, the muting resource configuration information comprises a muting periodicity and a muting pattern index. In some embodiments, the muting periodicity is pre-defined by the system. In some embodiments, the value of the muting periodicity can be indicated from the upper-level IAB node to the lower-level IAB node using a bit field. For example, if there are 4 values of the muting periodicity, including 40, 80, 160 and 320 ms, 4 2-bit index can be used to indicate these values. Specifically, 00 represents a muting periodicity of 40 ms; 01 represents a muting periodicity of 80 ms; 10 represents a muting periodicity of 160 ms; and 11 represents a muting periodicity of 320 ms. In some embodiments, the muting periodicity is a fixed value and pre-configured to all the IAB nodes and in this case, the muting resource configuration information does not comprise a muting periodicity.

In some embodiment, at least one muting resource for a lower-level IAB node can be directly obtained according to its corresponding cell ID. Referring to FIG. 15, there are 8 resources for potential transmission of SSBs in a muting periodicity of 160 ms. For example, when the cell ID of lower-level IAB node is 001010111 in binary which corresponds to 87 in decimal, the muting pattern index of the lower-level IAB node is equal to 7, i.e., (87 mod 8)+1. The muting resource for the lower-level IAB node with a cell ID of 01010111 is 8. For another example, the upper-level IAB node can determine staggered resources for all the lower-level IAB nodes using cell ID mod 4. IAB nodes with in the same group comprise the values on the 2 least-significant bits (LSB). Further, the muting resource can be determined using a similar method discussed above. Specifically, the muting resource for the lower-level IAB node can be determined by the 8 most-significant bits (MSB) of the cell ID of the corresponding lower-level IAB node (e.g., 01010111 in binary and 87 in decimal) and its number of resources for potential transmission of SSBs in a muting periodicity, e.g., (87 mod 8)+1, which equals 8. The muting resource for the lower-level IAB node with a cell ID of 01010111 is 8. An overhead for the indication of muting pattern index according to the cell ID, can be comparably lower than that using an explicit indication, for example using a bit field.

In some embodiments, a random number generated by the upper-level IAB node can be directly used to indicate a muting resource for the lower-level IAB node. For example, referring to FIG. 15 again, there are 8 resources for potential transmission of SSBs in a muting periodicity of 160 ms. Specifically, a random number (i.e., 0-7) can directly indicate at least one muting resource can be configured to the lower-level IAB node. For example the upper-level IAB node transmits a random number 4 for the lower-level IAB node and the SSB transmission source 4 is a muting resource and the rest of the SSB transmission sources (i.e., 0-3, and 5-7) are resources for actual transmission of SSBs. In some embodiments, the random number and thus the muting resource remain constant in at least one muting periodicity. In some embodiments, a different random number can be generated by the upper-level IAB node and thus a different muting resource can be indicated to the lower-level IAB node in a different muting periodicity. Therefore, a possibility for measurement of adjacent IAB nodes can be improved according to this method for the muting resource indication according to random numbers generated by the upper-level IAB node through a plurality of muting periodicity.

In some embodiments, at least one muting resource can be also determined by comparing the SSB transmission resources with measurement resources configured by the upper-level IAB node to the lower-level IAB node. In some embodiments, the measurement resources can be configured from the upper-level IAB node to the lower-level IAB nodes by at least one of the following: a measurement periodicity, a measurement offset, a measurement lasting time, and a measurement frequency. For example, the measurement periodicity is 10 radio frames, the measurement offset is 5 radio frames, the measurement lasting time is 5 radio frames. In some embodiments, an edge of a radio frame 5 is used is used as the starting point of a measurement period, the measurement is performed for 5 radio frames on the time domain; and on the frequency domain, the measurement is further performed in a frequency range, which has a center at the measurement frequency and a bandwidth that is the same as the bandwidth of the SSB.

In some embodiments, when a resource of a reference signal (e.g., SS and PBCH blocks, and CSI-RS) transmission resource completely or partially overlaps with a measurement resource in the time-frequency domain, the resource is a muting resource. As used herein, a "measurement resource" refers to a resource in the time and frequency domain on which an IAB node receives reference signals (e.g., SS and PBCH blocks and CSI-RS) transmitted from adjacent IAB nodes. In the following description, we take SSBs as an example of reference signals.

A SSB transmission resource and a measurement resource are considered overlap if at least one of the following is true: OFDM symbols occupied by the SSB transmission resources and OFDM symbols occupied by the measurement resource overlap; the SSB transmission resources overlap with the measurement resources in both time and frequency domain; a time offset between the SSB transmission resource and the measurement resource is smaller than or equal to a pre-determined threshold value (e.g., X OFDM symbols or a time T); and a frequency offset between the SSB transmission resource and the measurement resource is smaller than or equal to a pre-determined threshold value (e.g., Y RE's, Z RB's or a frequency M kHz). In some embodiments, when the SSB transmission resources overlap with the measurement resource configured by the high-level IAB node, the SSB transmission resources in the muting period can be muted for the measurement of adjacent IAB nodes according to the muting resource configurations discussed in detail above. In some embodiments, a plurality of measurement resources overlaps with a plurality of SSBs transmission resources, resulting in a plurality of muting resources in a muting periodicity.

Referring back to FIG. 14, the method 1400 continues to operation 1404 in which at least one muting resource set comprising at least one muting resource in a half radio frame is determined according to some embodiments. The at least one muting resource set can be determined according to the muting resource configuration information and/or measurement resource configuration information as discussed above. Upon determining the at least one muting resource, muting resource configurations (i.e., maximum number of SSBs, OFDM symbols occupied by each SSB in a time slot) can be further performed by the lower-level IAB nodes according to various embodiments in FIGS. 3-13.

The method 1400 continues to operation 1406 in which IAB nodes 102-1A, 102-1B, and 102-2A transmits its SS/PBCH on at least one resource for actual transmission of SSBs to adjacent IAB nodes and detects its adjacent IAB nodes on at least one muting resource, according to some embodiments. The actual transmission of SSBs and measurement of adjacent IAB nodes are performed according to the at least one muting resource.

While various embodiments of the invention have been described above, it should be understood that they have been presented by way of example only, and not by way of limitation. Likewise, the various diagrams may depict an example architectural or configuration, which are provided to enable persons of ordinary skill in the art to understand exemplary features and functions of the invention. Such persons would understand, however, that the invention is not restricted to the illustrated example architectures or configurations, but can be implemented using a variety of alternative architectures and configurations. Additionally, as would be understood by persons of ordinary skill in the art, one or more features of one embodiment can be combined with one or more features of another embodiment described herein. Thus, the breadth and scope of the present disclosure should not be limited by any of the above-described exemplary embodiments.

It is also understood that any reference to an element herein using a designation such as "first," "second," and so forth does not generally limit the quantity or order of those elements. Rather, these designations can be used herein as a convenient means of distinguishing between two or more elements or instances of an element. Thus, a reference to first and second elements does not mean that only two elements can be employed, or that the first element must precede the second element in some manner.

Additionally, a person having ordinary skill in the art would understand that information and signals can be represented using any of a variety of different technologies and techniques. For example, data, instructions, commands, information, signals, bits and symbols, for example, which may be referenced in the above description can be represented by voltages, currents, electromagnetic waves, magnetic fields or particles, optical fields or particles, or any combination thereof.

A person of ordinary skill in the art would further appreciate that any of the some illustrative logical blocks, modules, processors, means, circuits, methods and functions described in connection with the aspects disclosed herein can be implemented by electronic hardware (e.g., a digital implementation, an analog implementation, or a combination of the two, which can be designed using source coding or some other technique), various forms of program or design code incorporating instructions (which can be referred to herein, for convenience, as "software" or a "software module), or combinations of both. To clearly illustrate this interchangeability of hardware and software, various illustrative components, blocks, modules, circuits, and steps have been described above generally in terms of their functionality. Whether such functionality is implemented as hardware, firmware or software, or a combination of these technique, depends upon the particular application and design constraints imposed on the overall system. Skilled artisans can implement the described functionality in various ways for each particular application, but such implementation decisions should not be interpreted as causing a departure from the scope of the present disclosure.

Furthermore, a person of ordinary skill in the art would understand that various illustrative logical blocks, modules, devices, components and circuits described herein can be implemented within or performed by an integrated circuit (IC) that can include a general purpose processor, a digital signal processor (DSP), an application specific integrated circuit (ASIC), a field programmable gate array (FPGA) or other programmable logic device, or any combination thereof. The logical blocks, modules, and circuits can further include antennas and/or transceivers to communicate with various components within the network or within the device. A general purpose processor can be a microprocessor, but in the alternative, the processor can be any conventional processor, controller, or state machine. A processor can also be implemented as a combination of computing devices, e.g., a combination of a DSP and a microprocessor, a plurality of microprocessors, one or more microprocessors in conjunction with a DSP core, or any other suitable configuration to perform the functions described herein.

If implemented in software, the functions can be stored as one or more instructions or code on a computer-readable medium. Thus, the steps of a method or algorithm disclosed herein can be implemented as software stored on a computer-readable medium. Computer-readable media includes both computer storage media and communication media including any medium that can be enabled to transfer a computer program or code from one place to another. A storage media can be any available media that can be accessed by a computer. By way of example, and not limitation, such computer-readable media can include RAM, ROM, EEPROM, CD-ROM or other optical disk storage, magnetic disk storage or other magnetic storage devices, or any other medium that can be used to store desired program code in the form of instructions or data structures and that can be accessed by a computer.

In this document, the term "module" as used herein, refers to software, firmware, hardware, and any combination of these elements for performing the associated functions described herein. Additionally, for purpose of discussion, the various modules are described as discrete modules; however, as would be apparent to one of ordinary skill in the art, two or more modules may be combined to form a single module that performs the associated functions according embodiments of the invention.

Additionally, memory or other storage, as well as communication components, may be employed in embodiments of the invention. It will be appreciated that, for clarity purposes, the above description has described embodiments of the invention with reference to different functional units and processors. However, it will be apparent that any suitable distribution of functionality between different functional units, processing logic elements or domains may be used without detracting from the invention. For example, functionality illustrated to be performed by separate processing logic elements, or controllers, may be performed by the same processing logic element, or controller. Hence, references to specific functional units are only references to a suitable means for providing the described functionality, rather than indicative of a strict logical or physical structure or organization.

Various modifications to the implementations described in this disclosure will be readily apparent to those skilled in the art, and the general principles defined herein can be applied to other implementations without departing from the scope of this disclosure. Thus, the disclosure is not intended to be limited to the implementations shown herein, but is to be accorded the widest scope consistent with the novel features and principles disclosed herein, as recited in the claims below.

The invention claimed is:

1. A method performed by a first wireless communication node, comprising:
receiving a configuration message, wherein the configuration message indicates a configuration of at least one measurement resource from a second wireless communication node;
determining at least one overlapping resource between the at least one measurement resource and a first plurality of resources; and
determining at least one muting resource set among the first plurality of resources based on a selected muting pattern within a selected muting pattern table, wherein the at least one muting resource set comprises the at least one overlapping resource,
wherein the selected muting pattern table comprises a plurality of muting patterns, and the selected muting pattern is selected from the plurality of muting patterns based on a calculated muting pattern index, wherein the muting pattern index is calculated by a modulo operation, wherein the modulo operation comprises obtaining a remainder of a division of a cell identification (ID) number by a number of the first plurality of resources.

2. The method of claim 1, wherein the configuration message is transmitted from the second wireless communication node to the first wireless communication node using at least one of the following: system information block (SIB); and UE-specified radio resource control (RRC) signaling.

3. The method of claim 1, wherein at least one first resource of the first plurality of resources comprises one of the following: a period of potential transmission of a plurality of synchronization signal blocks (SSBs) and a period of actual transmission of the SSBs.

4. The method of claim 1, wherein the at least one measurement resource is configured by at least one of the following: a measurement periodicity, a measurement offset, a measurement duration, and a frequency range.

5. The method of claim 1, wherein the at least one overlapping resource further occupies at least one of the following:
at least one orthogonal frequency division multiplexing (OFDM) symbol wherein the at least one OFDM symbol is occupied by the first plurality of resource set and the at least one measurement resource in a time domain; and
at least one first resource of the first plurality of resources, wherein a second interval in a frequency domain between the at least one first resource and the at least one measurement resource is equal to or smaller than a second predetermined threshold value.

6. The method of claim 1, wherein at least one first resource in the first plurality of resources each comprises 4 orthogonal frequency division multiplexing (OFDM) symbols in a time slot in a time domain.

7. The method of claim 1, further comprising:
terminating a first actual transmission of a first synchronizing signal block (SSB) of a plurality of synchronization signal blocks (SSBs) on the at least one muting resource set in a first muting periodicity;
measuring a second SSB of the plurality of SSBs from a third wireless communication node with a first SSB transmission periodicity on the at least one muting resource set in the first muting periodicity; and
performing the first actual transmission of the first SSB with a second SSB transmission periodicity to the third wireless communication node for measurement,
wherein the first muting periodicity is equal to or greater than the first SSB transmission periodicity.

8. A method performed by a first wireless communication node, comprising:
transmitting a configuration message, wherein the configuration message indicates a configuration of at least one measurement resource to a second wireless communication node to determine at least one overlapping resource between the at least one measurement resource and a first plurality of resources, and further determine at least one muting resource according to the at least one overlapping resource, wherein:
the at least one muting resource is determined based on a selected muting pattern within a selected muting pattern table, and comprises the at least one overlapping resource, and
wherein the selected muting pattern table comprises a plurality of muting patterns, and the selected muting pattern is selected from the plurality of muting patterns based on a calculated muting pattern index, wherein the muting pattern index is calculated by a modulo operation, wherein the modulo operation comprises obtaining a remainder of a division of a cell identification (ID) number by a number of the first plurality of resources.

9. The method of claim 8, wherein the configuration message is transmitted from the first wireless communication node to the second wireless communication node using at least one of the following: a system information block (SIB); and UE-specified radio resource control (RRC) signaling.

10. The method of claim 8, wherein at least one first resource of the first plurality of resources comprises one of the following: a period of potential transmission of a plurality of synchronization signal blocks (SSBs) and a period of actual transmission of the plurality of SSBs.

11. The method of claim 8, wherein the at least one measurement resource is configured by at least one of the following: a measurement periodicity, a measurement offset, a measurement duration, and a frequency range.

12. The method of claim 8, wherein the at least one overlapping resource further occupies at least one of the following:
at least one orthogonal frequency division multiplexing (OFDM) symbol wherein the at least one OFDM symbol is occupied by the first plurality of resource set and the at least one measurement resource in a time domain; and
at least one first resource of the first plurality of resources, wherein a second interval in a frequency domain between the at least one first resource and the at least one measurement resource is equal to or smaller than a second predetermined threshold value.

13. The method of claim 8, wherein the at least one muting resource set each comprises a plurality of muting resources, wherein the plurality of muting resources each comprises 4 orthogonal frequency division multiplexing (OFDM) symbols in a time slot in a time domain.

14. A non-transitory computer-readable medium having stored thereon computer-executable instructions, when executed by a processor, carry out a method performed by a first wireless communication node, the method comprising:
receiving a configuration message, wherein the configuration message indicates a configuration of at least one measurement resource from a second wireless communication node;
determining at least one overlapping resource between the at least one measurement resource and a first plurality of resources; and
determining at least one muting resource set among the first plurality of resources based on a selected muting pattern within a selected muting pattern table, wherein the at least one muting resource set comprises the at least one overlapping resource,
wherein the selected muting pattern table comprises a plurality of muting patterns, and the selected muting pattern is selected from the plurality of muting patterns based on a calculated muting pattern index, wherein the muting pattern index is calculated by a modulo operation, wherein the modulo operation comprises obtaining a remainder of a division of a cell identification (ID) number by a number of the first plurality of resources.

15. The non-transitory computer-readable medium of claim 14, wherein the configuration message is transmitted from the second wireless communication node to the first wireless communication node using at least one of the following: system information block (SIB), and UE-specified radio resource control (RRC) signaling.

16. The non-transitory computer-readable medium of claim 14, wherein the at least one first resource comprises one of the following: a period of potential transmission of a plurality of synchronization signal blocks (SSBs) and a period of actual transmission of the SSBs.

17. The non-transitory computer-readable medium of claim 14, wherein the at least one measurement resource is configured by at least one of the following: a measurement periodicity, a measurement offset, a measurement duration, and a frequency range.

* * * * *